US007143649B2

(12) United States Patent
Yoshino

(10) Patent No.: US 7,143,649 B2
(45) Date of Patent: Dec. 5, 2006

(54) SOUND CHARACTERISTIC MEASURING DEVICE, AUTOMATIC SOUND FIELD CORRECTING DEVICE, SOUND CHARACTERISTIC MEASURING METHOD AND AUTOMATIC SOUND FIELD CORRECTING METHOD

(75) Inventor: Hajime Yoshino, Saitama (JP)

(73) Assignee: Pioneer Corporation, Tokyo (JP)

( * ) Notice: Subject to any disclaimer, the term of this patent is extended or adjusted under 35 U.S.C. 154(b) by 168 days.

(21) Appl. No.: 10/991,536

(22) Filed: Nov. 19, 2004

(65) Prior Publication Data

US 2005/0137859 A1 Jun. 23, 2005

(30) Foreign Application Priority Data

Nov. 19, 2003 (JP) ............................ 2003-389022

(51) Int. Cl.
*G01N 29/04* (2006.01)
*H04R 29/00* (2006.01)

(52) U.S. Cl. ............................ 73/579; 73/586; 381/59; 381/98

(58) Field of Classification Search .................. 73/579, 73/586, 597, 602; 381/59, 98, 86
See application file for complete search history.

(56) References Cited

U.S. PATENT DOCUMENTS 690,148 A * 12/1901 Yoshino et al. ............. 428/201
6,718,039 B1 * 4/2004 Klayman et al. .............. 381/1
6,928,172 B1 * 8/2005 Ohta ........................... 381/98
7,031,474 B1 * 4/2006 Yuen et al. ..................... 381/1
7,043,031 B1 * 5/2006 Klayman et al. ............. 381/98
7,054,448 B1 * 5/2006 Yoshino et al. ............... 381/59
7,058,187 B1 * 6/2006 Ohta ........................... 381/98
7,068,799 B1 * 6/2006 Ohta ........................... 381/98
2003/0128850 A1 * 7/2003 Kimura et al. ................ 381/82

FOREIGN PATENT DOCUMENTS

EP 1 253 805 10/2002
JP 2002-330499 11/2002

OTHER PUBLICATIONS

Milosevic et al., "Averaging in Various Methods for Reverberation Time Measurement", Telecommunications in Modern Satellite, Cable and Broadcasting Services, Oct. 1999, vol. 2, pp. 649-652.
Rasmussen et al., "Design and Measurement of Short Reverberation Times at Low Frequencies in Talks Studios", Journal of the Audio Engineering Society, vol. 39, No. 1/2, Jan. 1991, pp. 47-57.

* cited by examiner

*Primary Examiner*—Hezron Williams
*Assistant Examiner*—Jacques Saint-Surin
(74) *Attorney, Agent, or Firm*—Young & Thompson

(57) ABSTRACT

In order to measure a sound characteristic in a sound space, measurement sound is outputted to the sound space. Measurement sound data of a predetermined time period, which is prepared in advance, is divided into plural block periods, and plural block sound data are generated. A reproduction process of reproducing the plural block sound data in the order forming the measurement sound data is executed plural times by shifting the block sound data reproduced first by one for each time. Thereby, the measurement sound is outputted. When the above reproduction process is executed plural times, detected sound data corresponding to the block sound data reproduced at the identical reproduction order for each time are operated, and a sound characteristic is determined. Thereby, it becomes possible to measure the sound characteristic in the period shorter than the measurement sound data of the predetermined time period.

14 Claims, 19 Drawing Sheets

FIG. 3

<REPRODUCTION (OUTPUT) ORDER PATTERN>

| | BLOCK PERIOD | | | | | | | | | | | | | | | |
|---|---|---|---|---|---|---|---|---|---|---|---|---|---|---|---|---|
| NUMBER | T0 | T1 | T2 | T3 | T4 | T5 | T6 | T7 | T8 | T9 | T10 | T11 | T12 | T13 | T14 | T15 |
| 1st | pn0 | pn1 | pn2 | pn3 | pn4 | pn5 | pn6 | pn7 | pn8 | pn9 | pn10 | pn11 | pn12 | pn13 | pn14 | pn15 |
| 2nd | pn1 | pn2 | pn3 | pn4 | pn5 | pn6 | pn7 | pn8 | pn9 | pn10 | pn11 | pn12 | pn13 | pn14 | pn15 | pn0 |
| 3rd | pn2 | pn3 | pn4 | pn5 | pn6 | pn7 | pn8 | pn9 | pn10 | pn11 | pn12 | pn13 | pn14 | pn15 | pn0 | pn1 |
| 4th | pn3 | pn4 | pn5 | pn6 | pn7 | pn8 | pn9 | pn10 | pn11 | pn12 | pn13 | pn14 | pn15 | pn0 | pn1 | pn2 |
| 5th | pn4 | pn5 | pn6 | pn7 | pn8 | pn9 | pn10 | pn11 | pn12 | pn13 | pn14 | pn15 | pn0 | pn1 | pn2 | pn3 |
| 6th | pn5 | pn6 | pn7 | pn8 | pn9 | pn10 | pn11 | pn12 | pn13 | pn14 | pn15 | pn0 | pn1 | pn2 | pn3 | pn4 |
| 7th | pn6 | pn7 | pn8 | pn9 | pn10 | pn11 | pn12 | pn13 | pn14 | pn15 | pn0 | pn1 | pn2 | pn3 | pn4 | pn5 |
| 8th | pn7 | pn8 | pn9 | pn10 | pn11 | pn12 | pn13 | pn14 | pn15 | pn0 | pn1 | pn2 | pn3 | pn4 | pn5 | pn6 |
| 9th | pn8 | pn9 | pn10 | pn11 | pn12 | pn13 | pn14 | pn15 | pn0 | pn1 | pn2 | pn3 | pn4 | pn5 | pn6 | pn7 |
| 10th | pn9 | pn10 | pn11 | pn12 | pn13 | pn14 | pn15 | pn0 | pn1 | pn2 | pn3 | pn4 | pn5 | pn6 | pn7 | pn8 |
| 11th | pn10 | pn11 | pn12 | pn13 | pn14 | pn15 | pn0 | pn1 | pn2 | pn3 | pn4 | pn5 | pn6 | pn7 | pn8 | pn9 |
| 12th | pn11 | pn12 | pn13 | pn14 | pn15 | pn0 | pn1 | pn2 | pn3 | pn4 | pn5 | pn6 | pn7 | pn8 | pn9 | pn10 |
| 13th | pn12 | pn13 | pn14 | pn15 | pn0 | pn1 | pn2 | pn3 | pn4 | pn5 | pn6 | pn7 | pn8 | pn9 | pn10 | pn11 |
| 14th | pn13 | pn14 | pn15 | pn0 | pn1 | pn2 | pn3 | pn4 | pn5 | pn6 | pn7 | pn8 | pn9 | pn10 | pn11 | pn12 |
| 15th | pn14 | pn15 | pn0 | pn1 | pn2 | pn3 | pn4 | pn5 | pn6 | pn7 | pn8 | pn9 | pn10 | pn11 | pn12 | pn13 |
| 16th | pn15 | pn0 | pn1 | pn2 | pn3 | pn4 | pn5 | pn6 | pn7 | pn8 | pn9 | pn10 | pn11 | pn12 | pn13 | pn14 |

FIG. 4

<SOUND POWER DATA>

| NUMBER | BLOCK PERIOD | | | | | | | | | | | | | | | |
|---|---|---|---|---|---|---|---|---|---|---|---|---|---|---|---|---|
| | T0 | T1 | T2 | T3 | T4 | T5 | T6 | T7 | T8 | T9 | T10 | T11 | T12 | T13 | T14 | T15 |
| 1st | md0 | md1 | md2 | md3 | md4 | md5 | md6 | md7 | md8 | md9 | md10 | md11 | md12 | md13 | md14 | md15 |
| 2nd | md1 | md2 | md3 | md4 | md5 | md6 | md7 | md8 | md9 | md10 | md11 | md12 | md13 | md14 | md15 | md0 |
| 3rd | md2 | md3 | md4 | md5 | md6 | md7 | md8 | md9 | md10 | md11 | md12 | md13 | md14 | md15 | md0 | md1 |
| 4th | md3 | md4 | md5 | md6 | md7 | md8 | md9 | md10 | md11 | md12 | md13 | md14 | md15 | md0 | md1 | md2 |
| 5th | md4 | md5 | md6 | md7 | md8 | md9 | md10 | md11 | md12 | md13 | md14 | md15 | md0 | md1 | md2 | md3 |
| 6th | md5 | md6 | md7 | md8 | md9 | md10 | md11 | md12 | md13 | md14 | md15 | md0 | md1 | md2 | md3 | md4 |
| 7th | md6 | md7 | md8 | md9 | md10 | md11 | md12 | md13 | md14 | md15 | md0 | md1 | md2 | md3 | md4 | md5 |
| 8th | md7 | md8 | md9 | md10 | md11 | md12 | md13 | md14 | md15 | md0 | md1 | md2 | md3 | md4 | md5 | md6 |
| 9th | md8 | md9 | md10 | md11 | md12 | md13 | md14 | md15 | md0 | md1 | md2 | md3 | md4 | md5 | md6 | md7 |
| 10th | md9 | md10 | md11 | md12 | md13 | md14 | md15 | md0 | md1 | md2 | md3 | md4 | md5 | md6 | md7 | md8 |
| 11th | md10 | md11 | md12 | md13 | md14 | md15 | md0 | md1 | md2 | md3 | md4 | md5 | md6 | md7 | md8 | md9 |
| 12th | md11 | md12 | md13 | md14 | md15 | md0 | md1 | md2 | md3 | md4 | md5 | md6 | md7 | md8 | md9 | md10 |
| 13th | md12 | md13 | md14 | md15 | md0 | md1 | md2 | md3 | md4 | md5 | md6 | md7 | md8 | md9 | md10 | md11 |
| 14th | md13 | md14 | md15 | md0 | md1 | md2 | md3 | md4 | md5 | md6 | md7 | md8 | md9 | md10 | md11 | md12 |
| 15th | md14 | md15 | md0 | md1 | md2 | md3 | md4 | md5 | md6 | md7 | md8 | md9 | md10 | md11 | md12 | md13 |
| 16th | md15 | md0 | md1 | md2 | md3 | md4 | md5 | md6 | md7 | md8 | md9 | md10 | md11 | md12 | md13 | md14 |
| TOTAL POWER | rv0 | rv1 | rv2 | rv3 | rv4 | rv5 | rv6 | rv7 | rv8 | rv9 | rv10 | rv11 | rv12 | rv13 | rv14 | rv15 |

FIG. 6

<REPRODUCTION (OUTPUT) ORDER PATTERN>

| | BLOCK PERIOD | | | | | | | | | | | | | | | | | | |
|---|---|---|---|---|---|---|---|---|---|---|---|---|---|---|---|---|---|---|---|
| NUMBER | T0 | T1 | T2 | T3 | T4 | T5 | T6 | T7 | T8 | T9 | T10 | T11 | T12 | T13 | T14 | T15 | T16 | T17 | ····· | T31 |
| 1st | pn0 | pn1 | pn2 | pn3 | pn4 | pn5 | pn6 | pn7 | pn8 | pn9 | pn10 | pn11 | pn12 | pn13 | pn14 | pn15 | pn0 | pn1 | ····· | pn15 |
| 2nd | pn1 | pn2 | pn3 | pn4 | pn5 | pn6 | pn7 | pn8 | pn9 | pn10 | pn11 | pn12 | pn13 | pn14 | pn15 | pn0 | pn1 | pn2 | ····· | pn0 |
| 3rd | pn2 | pn3 | pn4 | pn5 | pn6 | pn7 | pn8 | pn9 | pn10 | pn11 | pn12 | pn13 | pn14 | pn15 | pn0 | pn1 | pn2 | pn3 | ····· | pn1 |
| 4th | pn3 | pn4 | pn5 | pn6 | pn7 | pn8 | pn9 | pn10 | pn11 | pn12 | pn13 | pn14 | pn15 | pn0 | pn1 | pn2 | pn3 | pn4 | ····· | pn2 |
| 5th | pn4 | pn5 | pn6 | pn7 | pn8 | pn9 | pn10 | pn11 | pn12 | pn13 | pn14 | pn15 | pn0 | pn1 | pn2 | pn3 | pn4 | pn5 | ····· | pn3 |
| 6th | pn5 | pn6 | pn7 | pn8 | pn9 | pn10 | pn11 | pn12 | pn13 | pn14 | pn15 | pn0 | pn1 | pn2 | pn3 | pn4 | pn5 | pn6 | ····· | pn4 |
| 7th | pn6 | pn7 | pn8 | pn9 | pn10 | pn11 | pn12 | pn13 | pn14 | pn15 | pn0 | pn1 | pn2 | pn3 | pn4 | pn5 | pn6 | pn7 | ····· | pn5 |
| 8th | pn7 | pn8 | pn9 | pn10 | pn11 | pn12 | pn13 | pn14 | pn15 | pn0 | pn1 | pn2 | pn3 | pn4 | pn5 | pn6 | pn7 | pn8 | ····· | pn6 |
| 9th | pn8 | pn9 | pn10 | pn11 | pn12 | pn13 | pn14 | pn15 | pn0 | pn1 | pn2 | pn3 | pn4 | pn5 | pn6 | pn7 | pn8 | pn9 | ····· | pn7 |
| 10th | pn9 | pn10 | pn11 | pn12 | pn13 | pn14 | pn15 | pn0 | pn1 | pn2 | pn3 | pn4 | pn5 | pn6 | pn7 | pn8 | pn9 | pn10 | ····· | pn8 |
| 11th | pn10 | pn11 | pn12 | pn13 | pn14 | pn15 | pn0 | pn1 | pn2 | pn3 | pn4 | pn5 | pn6 | pn7 | pn8 | pn9 | pn10 | pn11 | ····· | pn9 |
| 12th | pn11 | pn12 | pn13 | pn14 | pn15 | pn0 | pn1 | pn2 | pn3 | pn4 | pn5 | pn6 | pn7 | pn8 | pn9 | pn10 | pn11 | pn12 | ····· | pn10 |
| 13th | pn12 | pn13 | pn14 | pn15 | pn0 | pn1 | pn2 | pn3 | pn4 | pn5 | pn6 | pn7 | pn8 | pn9 | pn10 | pn11 | pn12 | pn13 | ····· | pn11 |
| 14th | pn13 | pn14 | pn15 | pn0 | pn1 | pn2 | pn3 | pn4 | pn5 | pn6 | pn7 | pn8 | pn9 | pn10 | pn11 | pn12 | pn13 | pn14 | ····· | pn12 |
| 15th | pn14 | pn15 | pn0 | pn1 | pn2 | pn3 | pn4 | pn5 | pn6 | pn7 | pn8 | pn9 | pn10 | pn11 | pn12 | pn13 | pn14 | pn15 | ····· | pn13 |
| 16th | pn15 | pn0 | pn1 | pn2 | pn3 | pn4 | pn5 | pn6 | pn7 | pn8 | pn9 | pn10 | pn11 | pn12 | pn13 | pn14 | pn15 | pn0 | ····· | pn14 |

FIRST CYCLE (T0–T15) SECOND CYCLE (T16–T31)

FIG. 7

<SOUND POWER DATA>

| | BLOCK PERIOD | | | | | | | | | | | | | | | | | | | |
|---|---|---|---|---|---|---|---|---|---|---|---|---|---|---|---|---|---|---|---|---|
| NUMBER | T0 | T1 | T2 | T3 | T4 | T5 | T6 | T7 | T8 | T9 | T10 | T11 | T12 | T13 | T14 | T15 | T16 | T17 | ..... | T31 |
| 1st | md0 | md1 | md2 | md3 | md4 | md5 | md6 | md7 | md8 | md9 | md10 | md11 | md12 | md13 | md14 | md15 | md0 | md1 | ..... | md15 |
| 2nd | md1 | md2 | md3 | md4 | md5 | md6 | md7 | md8 | md9 | md10 | md11 | md12 | md13 | md14 | md15 | md0 | md1 | md2 | ..... | md0 |
| 3rd | md2 | md3 | md4 | md5 | md6 | md7 | md8 | md9 | md10 | md11 | md12 | md13 | md14 | md15 | md0 | md1 | md2 | md3 | ..... | md1 |
| 4th | md3 | md4 | md5 | md6 | md7 | md8 | md9 | md10 | md11 | md12 | md13 | md14 | md15 | md0 | md1 | md2 | md3 | md4 | ..... | md2 |
| 5th | md4 | md5 | md6 | md7 | md8 | md9 | md10 | md11 | md12 | md13 | md14 | md15 | md0 | md1 | md2 | md3 | md4 | md5 | ..... | md3 |
| 6th | md5 | md6 | md7 | md8 | md9 | md10 | md11 | md12 | md13 | md14 | md15 | md0 | md1 | md2 | md3 | md4 | md5 | md6 | ..... | md4 |
| 7th | md6 | md7 | md8 | md9 | md10 | md11 | md12 | md13 | md14 | md15 | md0 | md1 | md2 | md3 | md4 | md5 | md6 | md7 | ..... | md5 |
| 8th | md7 | md8 | md9 | md10 | md11 | md12 | md13 | md14 | md15 | md0 | md1 | md2 | md3 | md4 | md5 | md6 | md7 | md8 | ..... | md6 |
| 9th | md8 | md9 | md10 | md11 | md12 | md13 | md14 | md15 | md0 | md1 | md2 | md3 | md4 | md5 | md6 | md7 | md8 | md9 | ..... | md7 |
| 10th | md9 | md10 | md11 | md12 | md13 | md14 | md15 | md0 | md1 | md2 | md3 | md4 | md5 | md6 | md7 | md8 | md9 | md10 | ..... | md8 |
| 11th | md10 | md11 | md12 | md13 | md14 | md15 | md0 | md1 | md2 | md3 | md4 | md5 | md6 | md7 | md8 | md9 | md10 | md11 | ..... | md9 |
| 12th | md11 | md12 | md13 | md14 | md15 | md0 | md1 | md2 | md3 | md4 | md5 | md6 | md7 | md8 | md9 | md10 | md11 | md12 | ..... | md10 |
| 13th | md12 | md13 | md14 | md15 | md0 | md1 | md2 | md3 | md4 | md5 | md6 | md7 | md8 | md9 | md10 | md11 | md12 | md13 | ..... | md11 |
| 14th | md13 | md14 | md15 | md0 | md1 | md2 | md3 | md4 | md5 | md6 | md7 | md8 | md9 | md10 | md11 | md12 | md13 | md14 | ..... | md12 |
| 15th | md14 | md15 | md0 | md1 | md2 | md3 | md4 | md5 | md6 | md7 | md8 | md9 | md10 | md11 | md12 | md13 | md14 | md15 | ..... | md13 |
| 16th | md15 | md0 | md1 | md2 | md3 | md4 | md5 | md6 | md7 | md8 | md9 | md10 | md11 | md12 | md13 | md14 | md15 | md0 | ..... | md14 |
| TOTAL POWER | rv0 | rv1 | rv2 | rv3 | rv4 | rv5 | rv6 | rv7 | rv8 | rv9 | rv10 | rv11 | rv12 | rv13 | rv14 | rv15 | rv16 | rv17 | ..... | rv31 |

FIRST CYCLE (T0–T15) SECOND CYCLE (T16–T31)

SOUND CHARACTERISTIC MEASURING DEVICE, AUTOMATIC SOUND FIELD CORRECTING DEVICE, SOUND CHARACTERISTIC MEASURING METHOD AND AUTOMATIC SOUND FIELD CORRECTING METHOD

BACKGROUND OF THE INVENTION

1. Field of the Invention

The present invention relates to a measuring technique of sound characteristics in a sound space, such as a reverberation characteristic, and an automatic sound field correcting technique by using the measuring technique.

2. Description of Related Art

For an audio system having a plurality of speakers to provide a high quality sound space, it is required to automatically create an appropriate sound space with much presence. In other words, it is required for the audio system to automatically correct sound field characteristics because it is quite difficult for a listener to appropriately adjust the phase characteristic, the frequency characteristic, the sound pressure level and the like of sound reproduced by a plurality of speakers by manually manipulating the audio system by himself to obtain appropriate sound space.

So far, as this kind of automatic sound field correcting system, there is known a system disclosed in Japanese Patent Application Laid-open under No. 2002-330499. In this system, for each signal transmission path corresponding to plural channels, a test signal outputted from a speaker is collected, and a frequency characteristic thereof is analyzed. Then, by setting coefficients of an equalizer provided on the signal transmission path, each signal transmission path is adjusted to have a desired frequency characteristic. As the test signal, a pink noise is used, for example.

The above-mentioned measurement of the frequency characteristic is performed by outputting the test signal which is comparatively long in view of time. For example, in order to measure a characteristic of a frequency band of about 20 Hz, the test signal is outputted during a time period equal to or larger than 50 ms (msec), corresponding to one period of the 20 Hz test signal, and is collected by a microphone. Thereby, the frequency characteristic is measured. Therefore, it is difficult to obtain an instantaneous sound characteristic in a certain sound field or a sound characteristic in quite short time width (e.g., about 5 ms). Particularly, when the frequency band subjected to measurement is a low-frequency band, it is necessary to perform the measurement during the period including one period of the test signal of the low-frequency at the minimum, as described above. Therefore, it is difficult to measure the instantaneous sound characteristic or the sound characteristic in quite the short time width, in such the low-frequency band.

However, there is sometimes required such the instantaneous sound characteristic or the sound characteristic in quite the short time width. For example, in correction of the sound characteristic by the above-mentioned automatic sound field correcting system, when the sound characteristic is desired to be corrected on the basis of only a sound characteristic in a specific period comparatively short in view of time after outputting the test signal, it is necessary to measure the sound characteristic only in that short time period.

SUMMARY OF THE INVENTION

The present invention has been achieved in order to solve the above problems. It is an object of this invention to provide a sound characteristic measuring technique capable of easily measuring an instantaneous sound characteristic or a sound characteristic in quite short time width, for all frequency bands or for a predetermined frequency band, particularly for a low-frequency band. Further, it is another object of this invention to provide an automatic sound field correcting technique of automatically correcting a sound characteristic of a space on the basis of the sound characteristic obtained by such the sound characteristic measuring technique.

According to one aspect of the present invention, there is provided a sound characteristic measuring device including: a measurement sound output unit which outputs measurement sound to a sound space; a detecting unit which collects the measurement sound in the sound space and outputs correspondent detected sound data; and a characteristic determining unit which determines a sound characteristic in the sound space based on the detected sound data, wherein the measurement sound output unit includes; a block sound data generating unit which divides measurement sound data of a predetermined time period into plural block periods and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, and wherein the characteristic determining unit operates the detected sound data corresponding to the block sound data reproduced at an identical reproduction order during each reproduction process, and determines the sound characteristic.

In accordance with the embodiment, the measurement sound is outputted to the sound space in order to measure the sound characteristic in the sound space. The measurement sound data of the predetermined time period, which is prepared in advance, is divided into the plural block periods, and the plural block sound data are generated. The reproduction process of reproducing the plural block sound data in a reproduction order pattern forming the measurement sound data is executed, for all patterns of the reproduction order obtained by shifting the block sound data reproduced first by one. Thereby, the measurement sound is outputted. The detected sound data corresponding to the block sound data reproduced at an identical reproduction order during each reproduction process are operated, and the sound characteristic is determined. Namely, for example, the detected sound data corresponding to the plural block sound data reproduced first during each reproduction process, or corresponding to the plural block sound data reproduced second during each reproduction process are operated, and the sound characteristic is determined.

In the above case, the characteristic determining unit may determine a reverberation characteristic for each block period based on the detected sound data corresponding to the block sound data reproduced at the identical reproduction order. Thereby, the sound characteristic of the time width corresponding to the measurement sound data of the predetermined time period can be obtained.

In the above case, the characteristic determining unit may generate the reverberation characteristic during the predetermined time period based on the reverberation characteristic for each block period.

In addition, the characteristic determining unit may include: a unit which divides the detected data into a predetermined number of frequency bands and generates detected data for each frequency band; and a unit which determines the reverberation characteristic for each of the predetermined number of frequency bands based on the detected data for each frequency band. Thereby, it becomes possible to obtain the sound characteristic for each frequency band by the unit of the block.

As an example, the reproduction processing unit may execute the reproduction process for a number of block periods included in the measurement sound data. For example, when the measurement sound data is divided into 16 block periods and 16 block sound data are generated, the above-mentioned reproduction process is executed 16 times. Thereby, it becomes possible to obtain the sound characteristic corresponding to all components of the measurement sound data.

In addition, as another example, the reproduction processing unit may reproduce the plural block sound data repeatedly for plural cycles during each reproduction process. Thereby, it becomes possible to obtain the sound characteristic of a time period longer than the measurement sound of the predetermined time period, which is prepared in advance.

According to another aspect of the present invention, there is provided a sound characteristic measuring device including: a measurement sound output unit which outputs measurement sound including a signal of a predetermined frequency to a sound space; a detecting unit which collects the measurement sound in the sound space and outputs correspondent detected sound data; and a characteristic determining unit which determines a sound characteristic in the sound space based on the detected sound data, wherein the measurement sound output unit includes: a block sound data generating unit which divides measurement sound data of a predetermined time period in to plural block periods each being smaller than a period corresponding to the predetermined frequency and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, and wherein the characteristic determining unit operates the detected sound data corresponding to the block sound data reproduced at an identical reproduction order during each reproduction process, and determines the sound characteristic of time width smaller than the period corresponding to the predetermined frequency.

In accordance with the embodiment, in order to measure the sound characteristic in the sound space, the measurement sound is outputted to the sound space. The measurement sound data of the predetermined time period, which is prepared in advance, is divided into the plural block periods, and the plural block sound data are generated. The reproduction process of reproducing the plural block sound data in the reproduction order pattern forming the measurement sound data is executed, for all patterns of the reproduction order obtained by shifting the block sound data reproduced first by one. Thereby, the measurement sound is outputted. It is noted that each of the plural block periods is smaller than the period of the signal of the predetermined frequency included in the measurement sound. The detected sound data corresponding to the block sound data reproduced at the identical reproduction order during each reproduction process are operated, and the sound characteristic is determined. Namely, for example, the detected sound data corresponding to the plural block sound data reproduced first during each reproduction process, or corresponding to the plural block sound data reproduced second during reproduction process are operated, and the sound characteristic is determined. Thus, it becomes possible to obtain the sound characteristic in the period shorter than the period of the signal of the frequency by using the measurement sound including the signal of the predetermined frequency.

According to another aspect of the present invention, there is provided an automatic sound field correcting device for applying a signal process onto plural audio signals on corresponding signal transmission paths respectively and outputting processed audio signals to correspondent plural speakers, including: a measurement sound output unit which outputs measurement sound to each signal transmission path; a detecting unit which collects the measurement sound on each signal transmission path, and outputs correspondent detected sound data; a characteristic determining unit which determines a sound characteristic of each signal transmission path in a measuring period subjected to measurement based on the detected sound data; and a frequency characteristic adjusting unit which adjusts a frequency characteristic of an audio signal of each signal transmission path based on the sound characteristic, wherein the measurement sound output unit includes: a block sound data generating unit which divides measurement sound data of a predetermined time period into plural block periods, and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, and wherein the characteristic determining unit operates the detected sound data corresponding to the block sound data reproduced at an identical reproduction order during each reproduction process, and determines the sound characteristic of each signal transmission path in the measuring period subjected to the measurement.

In accordance with the above automatic sound field correcting device, identically to the above-mentioned sound characteristic measurement device, it becomes possible to obtain the sound characteristic in the measuring period subjected to the measurement. By using the sound characteristic, the frequency characteristic of the audio signal on the signal transmission path is adjusted. Therefore, when predetermined measurement sound is outputted, only a certain time period thereafter can be determined as the measuring period subjected to the measurement, and the frequency characteristic can be corrected by using only the sound characteristic in the measuring period.

According to another aspect of the present invention, there may be provided the above sound characteristic measuring device and the above automatic sound field correcting device as computer programs to be executed on a computer. According to still another aspect of the present invention, there may be provided a sound characteristic measuring method and an automatic sound field correcting method, which are equivalent to the above sound characteristic measuring device and the above automatic sound field correcting device.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 3 is a diagram for explaining a method of outputting block sound data in measuring a sound characteristic.

FIG. 4 is a diagram showing an example of calculating sound powers and total powers corresponding to block sound data.

FIG. 6 is a diagram showing a method of outputting block sound data in measuring a sound characteristic.

FIG. 7 is a diagram showing an example of calculating sound powers and total powers corresponding to block sound data.

DETAILED DESCRIPTION OF THE PREFERRED EMBODIMENTS

The preferred embodiments of the present invention will now be described below with reference to the attached drawings.

[Sound Characteristic Measurement System]

Figure 1:
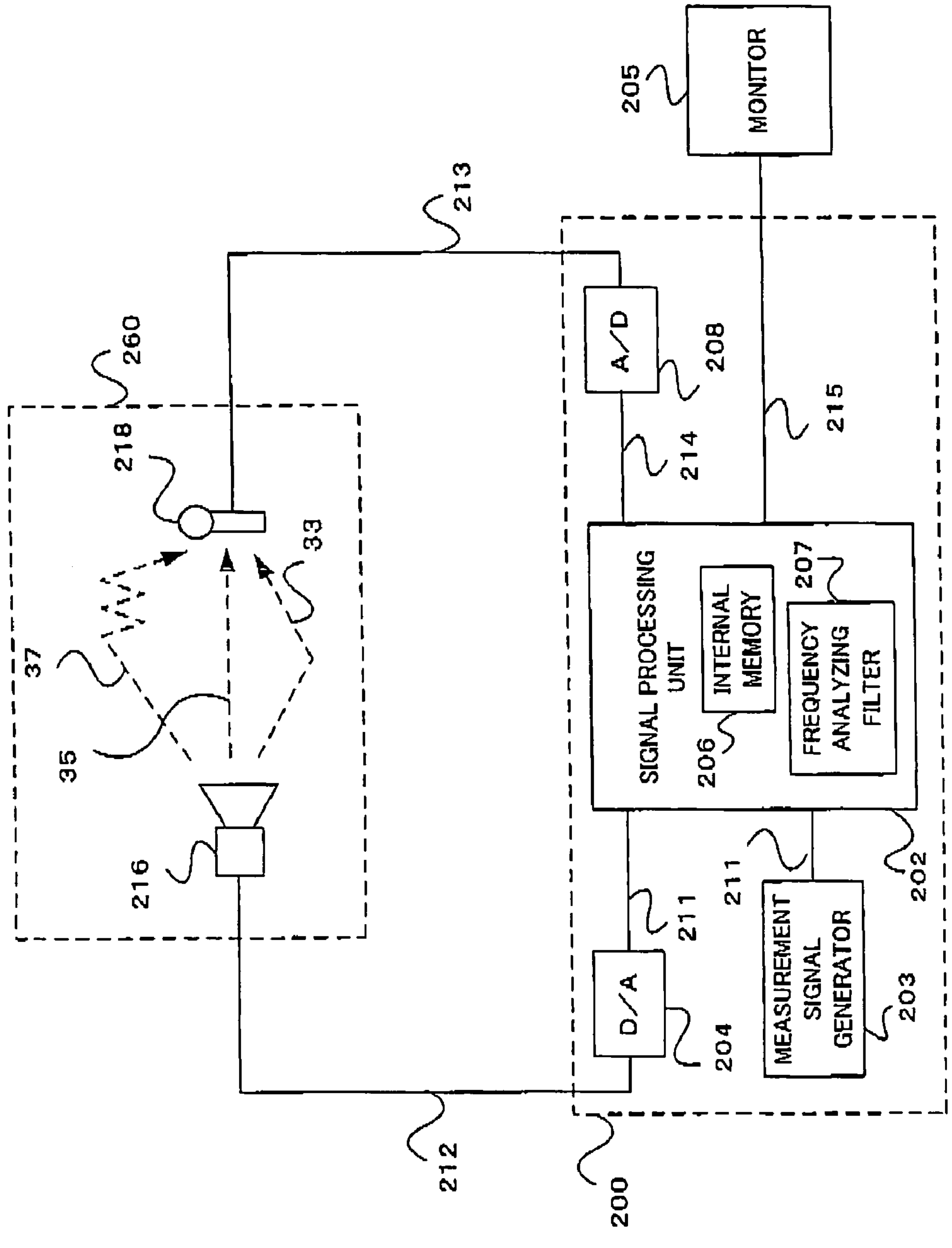
FIG. 1 schematically shows a configuration of a sound characteristic measurement system according to an embodiment.

First, the description will be given of the sound characteristic measurement system according to an embodiment of the present invention. FIG. 1 schematically shows a configuration of the sound characteristic measurement system according to the present embodiment. As shown in FIG. 1, the sound characteristic measurement system includes a sound characteristic measuring device 200, and a speaker 216, a microphone 218 and a monitor 205 which are connected to the sound characteristic measuring device 200, respectively. The speaker 216 and the microphone 218 are provided in a sound space 260 subjected to measurement. Typical examples of the sound space 260 are a listening room, a home theater and the like.

The sound characteristic measuring device 200 includes a signal processing unit 202, a measurement signal generator 203, a D/A converter 204 and an A/D converter 208. The signal processing unit 202 includes an internal memory 206 and a frequency analyzing filter 207 inside. The signal processing unit 202 supplies digital measurement sound data 211 outputted from the measurement signal generator 203 to the D/A converter 204, and the D/A converter 204 converts the measurement sound data 211 to an analog measurement signal 212 to supply it to the speaker 216. The speaker 216 outputs, to the sound space 260 subjected to the measurement, the measurement sound corresponding to the supplied measurement signal 212.

The microphone 218 collects the measurement sound outputted to the sound space 260, and supplies, to the A/D converter 208, a detecting signal 213 corresponding to the measurement sound. The A/D converter 208 converts the detecting signal 213 to a digital detected sound data 214, and supplies it to the signal processing unit 202.

In the sound space 260, the measurement sound outputted from the speaker 216 is collected by the microphone 218 mainly as a combination of a direct sound component 35, an initial reflective sound component 33 and a reverberation sound component 37. The signal processing unit 202 can obtain the sound characteristic of the sound space 260 on the basis of the detected sound data 214 corresponding to the measurement sound collected by the microphone 218. For example, by calculating a sound power for each frequency band, the signal processing unit 202 can obtain the reverberation characteristic for each frequency band of the sound space 260.

The internal memory 206 is a storage unit which temporarily stores the detected sound data 214 obtained via the microphone 218 and the A/D converter 208, and the signal processing unit 202 executes a process, such as an operation of the sound power, by using the detected sound data temporarily stored in the internal memory 206, and obtains the sound characteristic of the sound space 260. For example, the signal processing unit 202 can generate the reverberation characteristic of all frequency bands (i.e., full frequency band) to display it on a monitor 205. Also, the signal processing unit 202 can generate the reverberation characteristic for each frequency band by using the frequency analyzing filter 207 to display it on the monitor 205.

Figure 2:
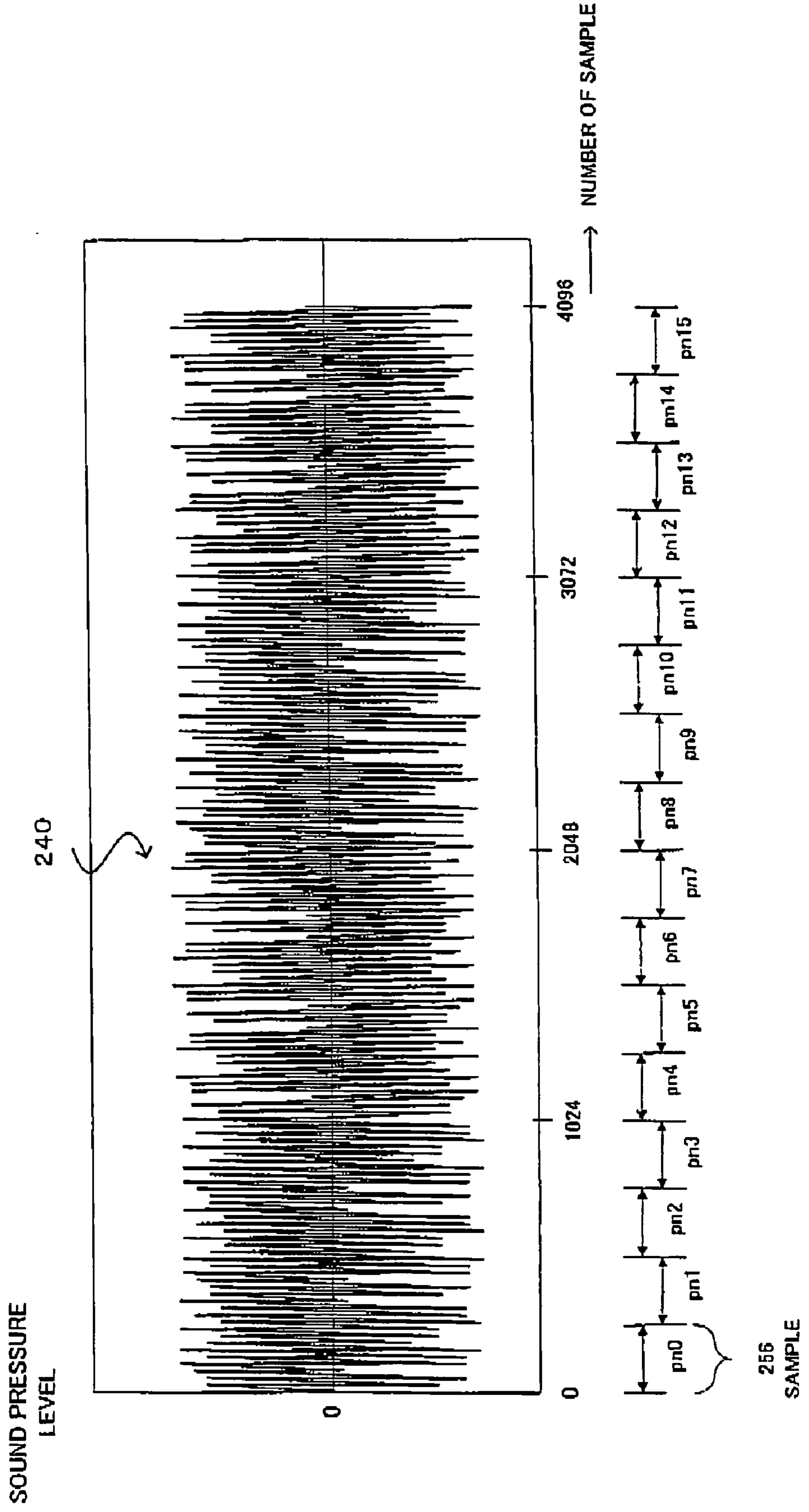
FIG. 2 shows a waveform example of measured sound data.

Next, a method of measuring the sound characteristic will be explained in detail. FIG. 2 shows a waveform example of a pink noise, which is an example of the measurement signal. The measurement signal may be a signal including the frequency component of the frequency band subjected to the measurement, and is not limited to the pink noise. In the example shown in FIG. 2, the pink noise including 4096 samples (about 80 ms) is prepared as digital data (hereafter, also referred to as "measurement sound data 240"). The measurement signal generator 203 includes a memory which stores the measurement sound data 240, and can output all the blocks or only a certain block of the measurement sound data 240 in accordance with the address given from the signal processing unit 202.

In the present embodiment, the measurement sound data 240 is divided into plural blocks (hereafter, referred to as "block sound data pn"). While the output order of the block sound data pn is shifted, the measurement sound is measured for plural times by the microphone 218, and obtained results are synthesized to continuously measure the sound power which is timely varying. Concretely, as shown in FIG. 2, the measurement sound data 240 including 4096 samples are divided into 16 short-time block sound data pn0 to pn15. The respective block sound data pn0 to pn15 have time width including 256 samples (corresponding to about 5 ms). At the time of measuring the sound characteristic, the block sound data pn are reproduced via the D/A converter 204 and the speaker 216 to be outputted to the sound space 206 as the measurement sound, in sequence. Thereby, the measurement is performed.

FIG. 3 shows the output (reproduction) order of the block sound data pn0 to pn15. In the present embodiment, as described above, the measurement sound data 240 including 4096 samples is divided into 16 block sound data pn0 to pn15 each including 256 samples, and they are continuously outputted in accordance with a reproduction order pattern shown in FIG. 3. Thereby, the measurement is performed. At that time, although the reproduction order of the 16 block sound data pn0 to pn15 follows the order shown in FIG. 2 in which the measurement sound data 240 is formed, the block sound data reproduced first is shifted by one block in each measurement, and the measurement is performed for all patterns of the reproduction order shown in FIG. 3, i.e., for 16 times.

It is noted that "block periods" T0 to T15 shown in FIG. 3 indicate positions of the respective block sound data pn0 to pn15 on the time axis of the whole measurement sound data 240 shown in FIG. 2. For example, the block period T0 corresponds to 256 samples included in the first block sound data pn0 of the measurement sound data 240 (i.e., the period approximately between 0 ms and 5 ms), and the block period T1 corresponds to 256 samples included in the next block sound data pn1 (i.e., the period approximately between 5 ms and 10 ms). The block period T15 corresponds to 256 samples included in the last block sound data pn15 of the measurement sound data 240 (i.e., the period approximately between 75 ms and 80 ms).

As shown in FIG. 3, in the present embodiment, with shifting the block sound data reproduced first by one, the block sound data pn0 to pn15 are outputted for all the patterns of the reproduction order, and the measurement is performed 16 times in total. Namely, at the first measurement, 16 block sound data pn are continuously outputted in the order of the block sound data pn0 to pn15, and the measurement is performed. At the second measurement, a reproduction starting position of the block sound data pn is shifted on the right side on the graph shown in FIG. 2 by one block, and 16 block sound data pn are continuously outputted in the order of the block sound data pn1 to pn15 and pn0, and the measurement is performed. The process is repeated in the above way. At the 16th measurement, 16 block sound data pn are continuously outputted in the order of the block sound data pn15 first, and pn0 to pn14 subsequently, and the measurement is performed.

During the measurement, the microphone 218 collects the measurement sound data 240 by the unit of each block sound data pn, and the signal processing unit 202 receives the detected sound data 214 from the A/D converter 208. The signal processing unit 202 stores, in the internal memory 206, the detected sound data of 256 samples, similarly to the unit of the block sound data pn, as one unit of detected sound data in the present embodiment. Also, the signal processing unit 202 calculates a sound power md on the basis of the detected sound data, and temporarily stores it in the internal memory 206. By assuming that the detected sound data of one block corresponding to one block sound data pn is formed by 256 samples from $d_1$ to $d_{256}$, the sound power "md" of the detected sound data of that one block is given by an equation below.

$$md=d_1^2+d_2^2+d_3^2+\ldots d_{256}^2 \quad (1)$$

FIG. 4 shows the sound powers thus obtained, corresponding to the block sound data pn. In FIG. 4, the sound power md0 corresponds to the block sound data pn0, and the sound power md1 corresponds to the block sound data pn1. Identically, the sound power md15 corresponds to the block sound data pn15. Comparing FIG. 3 and FIG. 4, in FIG. 4, the correspondent sound power md is indicated at the position corresponding to the block sound data pn of each measurement number of FIG. 3.

The signal processing unit 202 totals the sound powers md thus obtained, corresponding to each block sound data pn, for each block period (T0 to T15), and calculates total powers rv0 to rv15. Namely, the signal processing unit 202 adds the first to sixteenth sound powers md in the column direction for each block time shown in FIG. 4, and calculates the total power rv. Concretely, the total powers rv0 to rv15 are calculated by the equations below.

$$\begin{aligned} rv0 &= md0 + md1 + md2 + \ldots + md15 \quad (2) \\ rv1 &= md1 + md2 + md3 + \ldots + md0 \\ rv2 &= md2 + md3 + md4 + \ldots + md1 \\ &\vdots \\ rv15 &= md15 + md0 + md1 + \ldots + md14 \end{aligned}$$

As understood from FIG. 2 to FIG. 4, each of the total powers rv0 to rv15 is the sum of the sound powers md0 to md15 of the detected sound data corresponding to all the block sound data pn0 to pn15 in the correspondent block period. Namely, each of the total powers rv0 to rvl5 indicates a response of the sound space 260 corresponding to all the components of the measurement sound data 240 in the block period. For example, the total power rv0 indicates the response (sound power) corresponding to all the measurement sound data 240 in the block period T0, i.e., within about 5 ms from the measurement starting time (see FIG. 2). In addition, the total power rv1 indicates the sound power corresponding to all the measurement sound data 240 in the block period T1, i.e., within the time period from 5 ms to 10 ms after starting the measurement. Like this, in the present embodiment, the measurement sound data 240 is divided into the plural short-time block sound data pn0 to pn15, and the sound powers are measured for all the patterns of the reproduction order with shifting the reproduction order by one block every time, thereby to calculate the total power for each block period. Thus, it becomes possible to obtain the instantaneous sound characteristic or the sound characteristic in the time width much smaller than the time width of the whole measurement sound data 240.

Figure 5:
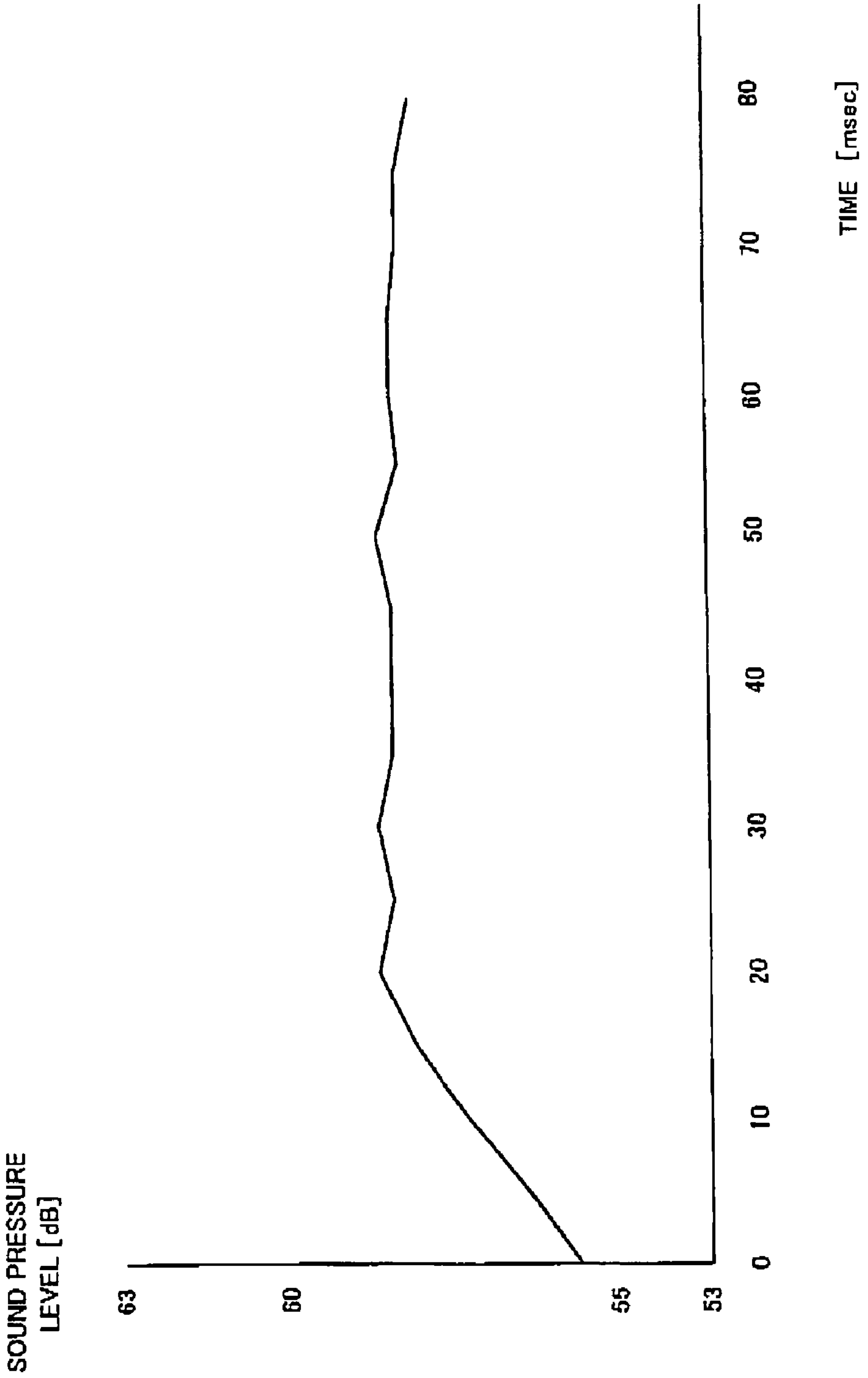
FIG. 5 shows an example of a reverberation characteristic for all frequency bands obtained by measurement.

FIG. 5 shows a calculation example of the reverberation characteristics for all frequency bands in the sound space subjected to the measurement, calculated on the basis of the total power for each block period thus obtained. In the present embodiment, 16 total powers are obtained in the period 0 ms to 80 ms, and the reverberation characteristic is independently obtained in the short time width being one block period (i.e., 5 ms).

In the above-mentioned embodiment, the reverberation characteristics for all frequency bands of about 80 ms are measured by using the measurement sound data 240 including 4096 samples (about 80 ms). However, by using the measurement sound data whose length and resolution (i.e., a number of division=16) are identical to those of the above-mentioned measurement sound data 240, much longer sound characteristic can be measured.

Now, the description will now be given of the example of measuring the reverberation characteristic of total 8192 samples (about 160 ms) by using the identical measurement sound data 240. In order to measure the reverberation characteristic having the length twice longer than the measurement sound data 240, the measurement sound data 240 including 4096 samples is divided into the short-time block sound data pn0 to pn15, and they are outputted twice (i.e., for two cycles) to perform the measurement. Namely, at each measurement, the block sound data pn0 to pn15 are outputted for two cycles during 32 block periods from T0 to T31, and the measurement is performed. FIG. 6 shows the output pattern of the block sound data pn in this case, and FIG. 7 shows an example of the obtained sound powers. As understood from FIG. 6 and FIG. 7, for example, at the first measurement, the output of the first cycle is performed in the order of the block sound data pn0 to pn15, and identically the output of the second cycle is performed in the order of the block sound data pn0 to pn15 afterward. Thereby, the detected sound data including 8192 samples (about 160 ms) can be obtained. Similarly, at the second to sixteenth measurement, the block sound data pn are outputted for two cycles. Thus, the reverberation characteristic of 8192 samples (about 160 ms) can be obtained by calculating the total powers rv0 to rv31 for each of the block periods T0 to T31.

By the method, the length of the reverberation characteristic to be obtained is double. However, since the identical measurement sound data is repeatedly outputted without making the used measurement sound data itself longer, increasing a number of measurements is unnecessary. For example, if the method of the present embodiment is executed by using the measurement sound data including 8192 samples in order to measure the reverberation characteristics including 8192 samples, it is necessary to perform the measurement for 32 times by using the block sound data pn0 to pn31 of 32 blocks (i.e., the number of measurement in FIG. 6 and FIG. 7 increases to 32 times). On the contrary, if the measurement is performed for two cycles by using the measurement sound data including 4096 samples, the reverberation characteristic of the double length can be measured with the number of measurement maintained at 16 times.

Figure 8:
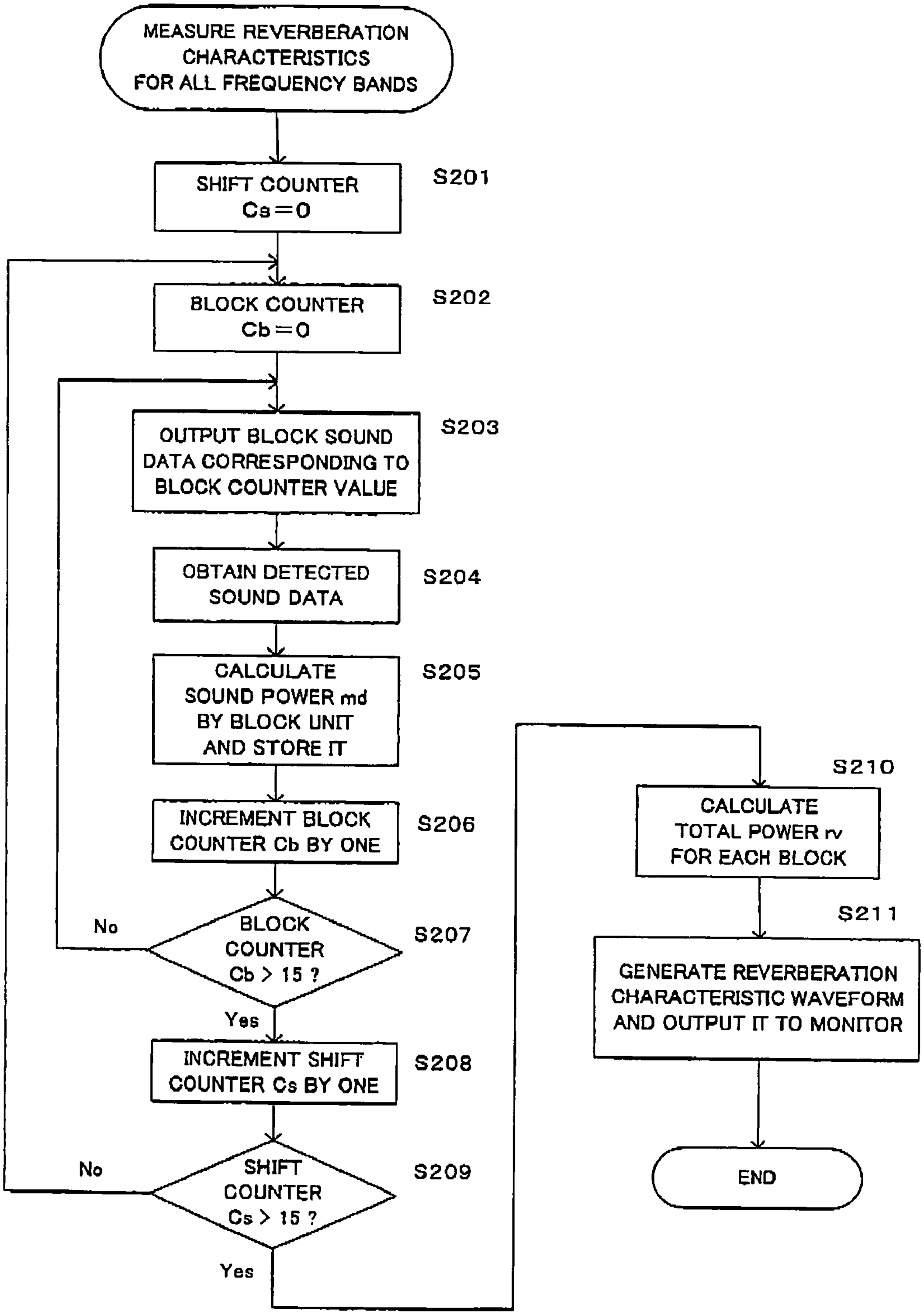
FIG. 8 is a flow chart of a reverberation characteristic measurement process for all frequency bands.

Next, the description will be given of the above-mentioned measurement process of the reverberation characteristics for all frequency bands (i.e., full frequency band). FIG. 8 is a flow chart of the measurement process of the reverberation characteristic for all frequency bands. Basically, the signal processing unit 202 in the sound characteristic measuring device 200 shown in FIG. 1 executes the process explained below by controlling the speaker 216, the microphone 218 and the like.

First, the signal processing unit 202 sets the value of a shift counter Cs to "0" (step S201). The shift counter Cs indicates the number of measurement, performed with shifting the block sound data pn0 to pn15. In the present embodiment, as shown in FIG. 3 and FIG. 4, since the measurement is performed 16 times in total, the value of the shift counter Cs finally increases up to "16". The first measurement is performed with the value of the shift counter Cs set to "0".

Next, the signal processing unit 202 sets the value of a block counter Cb to "0" (step S202). The block counter Cb designates the block sound data pn used for the measurement. With the value of the block counter Cb set to "0", the measurement by using the block sound data pn0 is performed.

Next, the signal processing unit 202 outputs, from the speaker 216, the block sound data pn designated by the block counter Cb at present (step 5203). Since the block counter Cb is set to "0" in step S202, first the block sound data pn0 is reproduced and outputted to the sound space 260 as the measurement sound. Then, the signal processing unit 202 obtains the detected sound data 214 collected from the sound space 260 by the microphone 218 and then A/D-converted (step S204). The signal processing unit 202 calculates the sound power md (md0 at this time) of the block period by the above-mentioned method by using the equation (1), and stores it in the internal memory 206 (step S205). Thus, the measurement of the first block period T0 at the first measurement is completed.

Next, the signal processing unit 202 increments the block counter Cb by one, and determines whether the value of the block counter Cb is larger than "15" or not (step S207). When the value of the block counter Cb is equal to or smaller than 15, the process returns to step S203 for performing the measurement in the next block period. Then, the measurement process corresponding to the next block period is executed (steps S203 to S206).

In that method, when the measurement by using all the block period, i.e., all the block sound data pn included in the measurement sound data 240 (16 block sound data pn0 to pn15 in the present embodiment), is completed, the value of the block counter Cb becomes 16 (step S207; Yes). Namely, the first measurement is completed, and the signal processing unit 202 increments the shift counter Cs by one (step S208). Thereby, the second measurement is started.

Afterward, identically to the first measurement, the signal processing unit 202 outputs the block sound data pn corresponding to the value of the block counter Cb (step S203), and obtains the detected sound data (step S204). Further, the signal processing unit 202 calculates the sound power md for each block period (step S205), and increments the block counter Cb by one (step S206). However, at the second measurement, as shown in FIG. 3, the block sound data pn reproduced first is shifted by one, and 16 block sound data pn are reproduced in the order of the block sound data pn1 to pn15 and then pn0. When the second measurement is completed (step S207; Yes), the signal processing unit 202 increments the shift counter Cs by one (step S208), and the third measurement is performed in the same manner. As described above, all of 16 block sound data pn0 to pn15 are reproduced at the respective measurement, but the block sound data reproduced first is shifted by one at each measurement, as shown in FIG. 3.

When the shift counter Cs becomes larger than "15", i.e., when the sixteenth measurement is completed (step S209; Yes), the values of all 16 sound powers md corresponding to 16 block periods are stored in the internal memory 206 in the signal processing unit 202, as shown in FIG. 4. Thus, in accordance with the above-mentioned equation (2), the signal processing unit 202 calculates the total power rv for each block, for each block period, i.e., by totaling the reverberation powers md in the column direction in FIG. 4

(step S210). Subsequently, the signal processing unit 202 generates the reverberation characteristic waveform shown in FIG. 5 on the basis of the total power values thus obtained, and displays it on the monitor 205 (step S211). Thereby, the user can know the reverberation characteristic of the sound space 260.

It is noted that the above explanation is directed to an example of the process in a case that the reverberation characteristic of 4096 samples (about 80 ms) is measured, as shown in FIG. 3 and FIG 4. On the other hand, when the reverberation characteristic of 8192 samples (about 160 ms) is measured as shown in FIG. 6 and FIG. 7, identically, it is determined whether the shift counter Cs is larger than "15" or not in step S209 in FIG. 8. However, it is determined whether the block counter Cb is larger than "31" or not in step S207. Namely, at each measurement, the block sound data of 32 blocks are measured.

Next, the description will be given of the measurement of the reverberation characteristic for each frequency according to the present embodiment. In the above-mentioned explanation, the reverberation characteristics for all frequency bands of the sound space 260 are measured by using the measurement sound data 240. However, in the present embodiment, it is further possible to obtain the reverberation characteristic for each frequency. A method thereof will be explained below.

Figure 10:
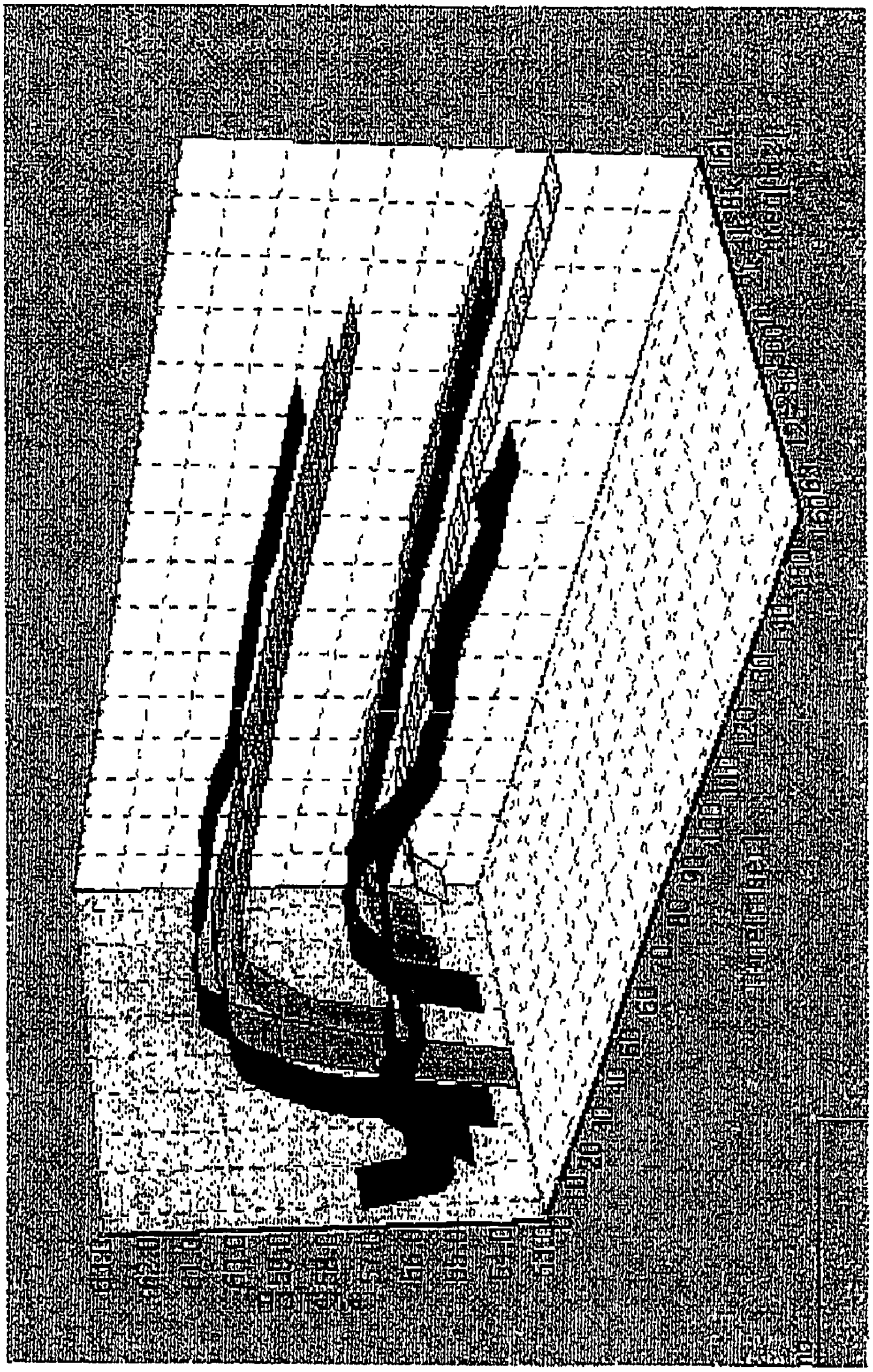
FIG. 10 shows an example of a reverberation characteristic for each frequency obtained by measurement.

The measurement sound data 240 is outputted, and the signal processing unit 202 frequency-analyzes the detected sound data 214 obtained via the microphone 218. Thereby, basically, the reverberation characteristic for each frequency can be obtained. The measurement of the reverberation characteristic for each frequency is identical to the measurement of the reverberation characteristics for all frequency bands, in that the measurement sound data 240 is divided into the plural block sound data pn and the measurement is performed for plural times with the output order of the sound data pn shifted. Concretely, by the one measurement shown in FIG. 3, the signal processing unit 202 can obtain the detected sound data 214 including 4096 samples. Therefore, the signal processing unit 202 calculates the reverberation power md by using the detected sound data including 4096 samples obtained at the one measurement, and performs filtering by using the frequency analyzing filter 207. Subsequently, the signal processing unit 202 generates the reverberation power md for each necessary frequency band, and stores it in the internal memory 206. For example, when the full frequency band is divided into nine frequency bands and the reverberation characteristics are measured, the signal processing unit 202 generates the reverberation powers md of the nine frequency bands by filtering. Afterward, the signal processing unit 202 totals the reverberation power md for each block period for each frequency band, and calculates the total power rv. In other word, there can be obtained the sound power data of the necessary number of frequency bands, which are shown in FIG. 4. The signal processing unit 202 then generates the three-dimensional reverberation characteristic shown in FIG. 10 for each frequency by using the total power data of the necessary number of frequency bands, and displays it on the monitor 205. In the example of FIG. 10, the full frequency band is divided into nine frequency bands, and the value on the frequency axis indicates a center frequency for each of the nine frequency bands. Like this, the reverberation characteristic can be measured for each frequency. In that case, the reverberation characteristic for each frequency is also obtained as the unit of the block period, i.e., as the reverberation characteristic of the short-time (about 5 ms).

FIG. 9 shows a flow chart of the measurement process of the reverberation characteristic for each frequency. The process is also basically executed by the signal processing unit 202, and the basic process is identical to the measurement process of the reverberation characteristic for the full frequency band, which is shown in FIG. 8.

Figure 9A:
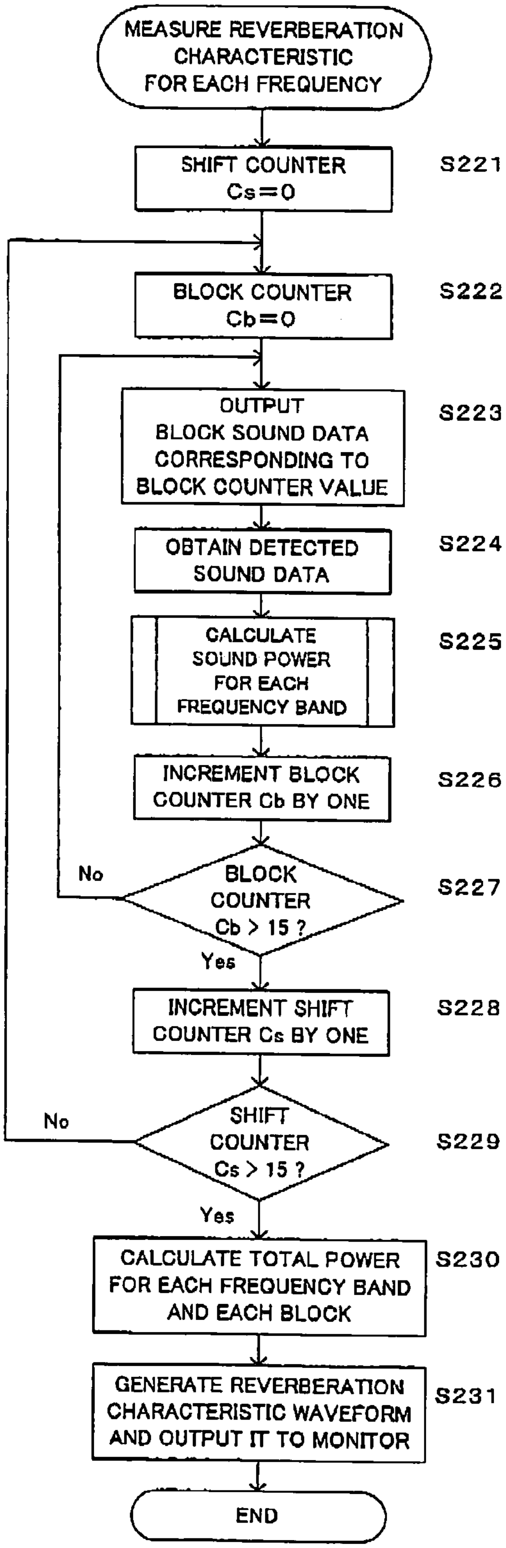
FIGS. 9A and 9B are flow charts of a reverberation characteristic measurement process for each frequency.

First, as shown in FIG. 9A, the signal processing unit 202 sets the shift counter Cs to "0" (step S221), and next sets the block counter Cb to "0" (step S222). Then, the signal processing unit 202 outputs the measurement sound data corresponding to the block counter value, i.e., the block sound data pn (step S223), and obtains the correspondent detected sound data (step S224). Moreover, the signal processing unit 202 executes a calculation process of the sound power for each frequency band (step S225).

Figure 9B:
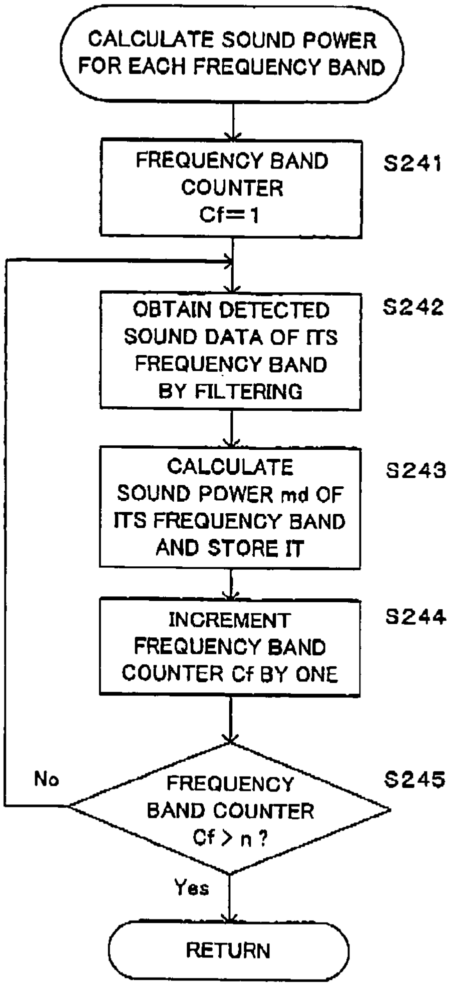

FIG. 9B shows the calculation process of the sound power for each frequency band. First, the signal processing unit 202 sets a frequency band counter of to "1" (step S241). The frequency band counter Cf designates the frequency band subjected to the measurement of the reverberation characteristic for each frequency. In the example, it is assumed that a number of frequency bands subjected to the measurement is "n". The signal processing unit 202 filters the detected sound data by using the frequency analyzing filter 207, and obtains the detected data of the frequency band corresponding to the frequency band counter Cf (step S242). Then, the signal processing unit 202 calculates the sound power md of the frequency band, and stores it (step S243).

Next, the signal processing unit 202 increments the frequency band counter Cf by one, and determines whether or not the frequency band counter Cf is larger than the frequency band number n subjected to the measurement (step S245). Until the frequency band counter Cf becomes larger than the frequency band number n (step S245; No), the signal processing unit 202 executes the identical process for the next frequency band (steps S242 to S243), and calculates the sound power md for the frequency band. When the frequency band counter Cf becomes larger than the frequency band number n (step S245; Yes), the process returns to the main routine shown in FIG. 9A.

In this way, the signal processing unit 202 calculates the sound power md for each block period, and stores it for each frequency band (step S225). Then, the signal processing unit 202 increments the value of the block counter by one (step S226), and repeats the process for the plural times, corresponding to the number of block periods (16 times in the present embodiment), until the block counter Cb becomes larger than 15, thereby to complete one measurement (step S227).

When one measurement is completed, the signal processing unit 202 increments the shift counter Cs by one, and performs the next measurement (step S228). When the shift counter Cs becomes larger than 15, i.e., when all 16 measurements are completed (step S229; Yes), the signal processing unit 202 calculates the sound power md for each number of measurement and for each block period, as shown in FIG. 3, for each frequency band, and further calculates the total power rv (step S230). Subsequently, for each frequency band, the signal processing unit 202 generates the reverberation characteristic waveform for each frequency, indicating the total power for each block period, i.e., the three-dimensional waveform, such as the waveform shown in FIG. 10, and displays it on the monitor 205 (step S231). Thereby, the reverberation characteristic for each frequency can be obtained. In this way, in the present embodiment, as for the reverberation characteristic for each frequency, it becomes possible to measure the characteristic by the unit of the block period, i.e., in the short time width (about 5 ms).

As shown in FIG. 3 and FIG. 4, in the above-mentioned example, by shifting the block sound data pn reproduced first by one, the block sound data pn is reproduced for all the patterns of the reproduction order. However, if the block sound data pn is reproduced for all the patterns of the reproduction order, it is unnecessary to shift the block sound data pn reproduced first by one. Namely, it does not matter that the order of performing the pattern of the first to sixteenth reproduction order shown in FIG. 3 is different. For example, it does not matter that the block sound data pn is reproduced in the order from the pattern of the sixteenth reproduction order, in the lowermost column in FIG. 3, to the pattern of the first reproduction order, in the uppermost column.

By the way, generally, when the levels are compared among the respective frequency bands in analyzing the frequency characteristic, there is known a method of making the measurement noise, such as the pink noise, pass through the frequency analyzing filter used for the measurement, not the measured portion (the sound space subjected to the measurement), to use the characteristic as offset data. Namely, the characteristic obtained without passing through the sound space is a characteristic of the measurement system itself, other than the sound space. Hence, if the characteristic of the sound space obtained by the actual measurement is corrected by using the offset data, the characteristic of the sound space itself can accurately be obtained with eliminating the characteristic of the measurement system. When such correction is performed, generally, the offset data is prepared as data corresponding to the whole measurement noise having the predetermined length (e.g., the pink noise including 4096 samples). Thus, if the above-mentioned correction is performed by using the offset data having the predetermined length in correspondence to the characteristic obtained by using only one portion of the measurement noise having the predetermined length (only short time width), an error thereof becomes large. However, by the above-mentioned method of the present embodiment, the obtained sound characteristic is the characteristic of short time width, e.g., 5 ms, which is obtained not by outputting only one portion of the measurement sound data, but by outputting the whole measurement sound data for all of the sixteen block periods. Therefore, there is an advantage that the correction can be performed without any error by applying the offset data corresponding to the above-mentioned measurement sound data having the predetermined length.

In addition, the reverberation sound component generally in the sound space is uncertain in which time zone to occur and during which period to exist after outputting the measurement sound. Therefore, it can not be guaranteed that the reverberation sound component in the sound space is accurately included in the reverberation characteristic obtained by outputting only the predetermined time width of the measurement sound, thus the accuracy is low. On the contrary, in the measurement method of the present embodiment, for example, the reverberation characteristic having the short time width of about 5 ms can be obtained. Since the reverberation characteristic is obtained on the basis of the detected sound data corresponding to the whole measurement sound (i.e., all of the sixteen block sound data), there is an advantage that the accurate characteristic, which the reverberation sound component in the sound space is accurately reflected in, can be obtained.

In addition, the method is particularly effective in that the sound characteristic of a low-frequency signal can be measured at the time width much smaller than the period of the signal. For example, when the sound characteristic in a certain sound space corresponding to the low-frequency signal of about 20 Hz is measured, it is necessary that the measurement sound having the time width of one period of the low-frequency signal of the 20 Hz at the minimum, i.e., the time width larger than 50 ms, is outputted, and the measurement sound is collected for the identical time width by the microphone to obtain the sound characteristic by operating the detected sound data. A response characteristic thus obtained has the time width of about 50 msec, and generally it is impossible to measure the response characteristic of the low-frequency signal of about 20 Hz by the unit of higher resolution, i.e., by the unit of the smaller time width.

On the contrary, in the above-mentioned method, the measurement sound data having the predetermined length is divided into the plural block sound data, and the measurement is performed for the plural times with the reproduction order shifted. Then, the result is synthesized for each identical block period. Thereby, there is an advantage that the sound characteristic in the short period corresponding to the whole measurement sound can be obtained. Therefore, even when the low-frequency signal having the predetermined frequency (e.g, 20 Hz) is used as the measurement sound data, it becomes possible to obtain the sound characteristic of the time period (about 5 ms in the above-mentioned example) much smaller than the period (i.e., 50 ms).

[Application to Automatic Sound Field Correcting Device]

Next, the description will be given of a concrete example that the above-mentioned sound characteristic measurement method is applied to the automatic sound field correcting system. In this example, the above-mentioned sound characteristic measurement method is applied to the measurement of the reverberation characteristic for each frequency in the automatic sound field correcting system, thereby to obtain the sound characteristic of the time period in which the measurement sound does not include the reverberation sound component. Based on the obtained sound characteristic, the automatic sound field correction is performed.

(System Configuration)

Figure 11:
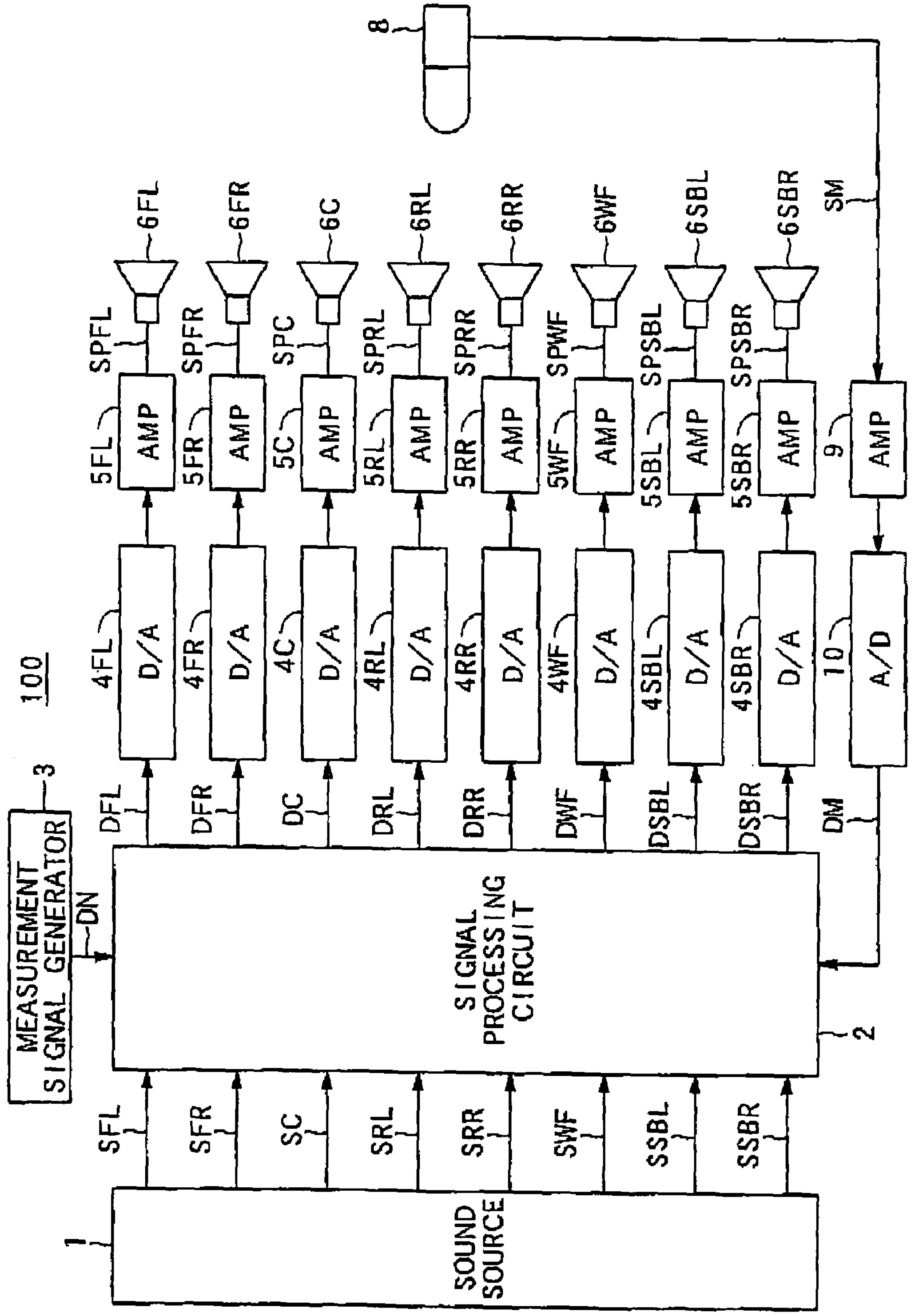
FIG. 11 is a block diagram showing a configuration of an audio system employing an automatic sound field correcting system according to an embodiment of the present invention.

An embodiment of an automatic sound field correcting system according to the present invention will now be described below with reference to the attached drawings. FIG. 11 is a block diagram showing a configuration of an audio system employing the automatic sound field correcting system of the present embodiment.

In FIG. 11, an audio system 100 includes a sound source 1 such as a CD (Compact Disc) player or a DVD (Digital Video Disc or Digital Versatile Disc) player, a signal processing circuit 2 to which the sound source 1 supplies digital audio signals SFL, SFR, SC, SRL, SRR, SWF, SSBSL and SSBR via the multi-channel signal transmission paths, and a measurement signal generator 3.

While the audio system 100 includes the multi-channel signal transmission paths, the respective channels are referred to as "FL-channel", "FR-channel" and the like in the following description. In addition, the subscripts of the reference number are omitted to refer to all of the multiple channels when the signals or components are expressed. On the other hand, the subscript is put to the reference number when a particular channel or component is referred to. For example, the description "digital audio signals S" means the digital audio signals SFL to SSBR, and the description "digital audio signal SFL" means the digital audio signal of only the FL-channel.

Further, the audio system 100 includes D/A converters 4FL to 4SBR for converting the digital output signals DFL to DSBR of the respective channels processed by the signal processing by the signal processing circuit 2 into analog signals, and amplifiers 5FL to 5SBR for amplifying the respective analog audio signals outputted by the D/A converters 4FL to 4SBR. In this system, the analog audio signals SPFL to SPSBR after the amplification by the amplifiers SFL to 5SBR are supplied to the multi-channel speakers 6FL to 6SBR positioned in a listening room 7, shown in FIG. 16 as an example, to output sounds.

The audio system 100 also includes a microphone 8 for collecting reproduced sounds at a listening position RV, an amplifier 9 for amplifying a collected sound signal SM outputted from the microphone 8, and an A/D converter 10 for converting the output of the amplifier 9 into a digital collected sound data DM to supply it to the signal processing circuit 2.

The audio system 100 activates full-band type speakers 6FL, 6FR, 6C, 6RL, 6RR having frequency characteristics capable of reproducing sound for substantially all audible frequency bands, a speaker 6WF having a frequency characteristic capable of reproducing only low-frequency sounds and surround speakers 6SBL and 6SBR positioned behind the listener, thereby creating sound field with presence around the listener at the listening position RV.

Figure 16:
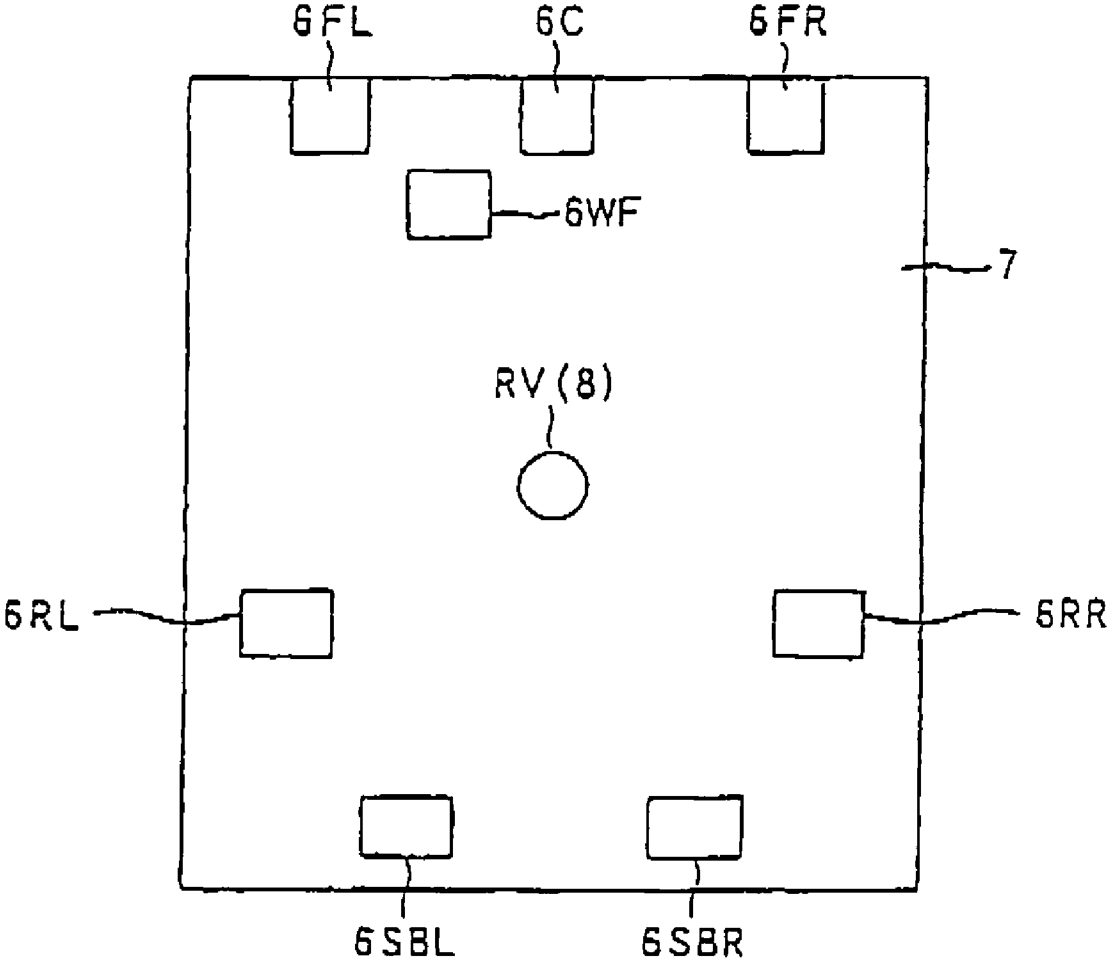
FIG. 16 is a diagram showing an example of speaker arrangement in a certain sound field environment.

With respect to the positions of the speakers, as shown in FIG. 16, for example, the listener places the two-channel, left and right speakers (a front-left speaker and a front-right speaker) 6FL, 6FR and a center speaker 6C, in front of the listening position RV, in accordance with the listener's taste. Also the listener places the two-channel, left and right speakers (a rear-left speaker and a rear-right speaker) 6RL, 6RR as well as two-channel, left and right surround speakers 6SBL, 6SBR behind the listening position RV, and further places the sub-woofer 6WF exclusively used for the reproduction of low-frequency sound at any position. The automatic sound field correcting system installed in the audio system 100 supplies the analog audio signals SPFL to SPSBR, for which the frequency characteristic, the signal level and the signal propagation delay characteristic for each channel are corrected, to those 8 speakers 6FL to 6SBR to output sounds, thereby creating sound field space with presence.

Figure 12:
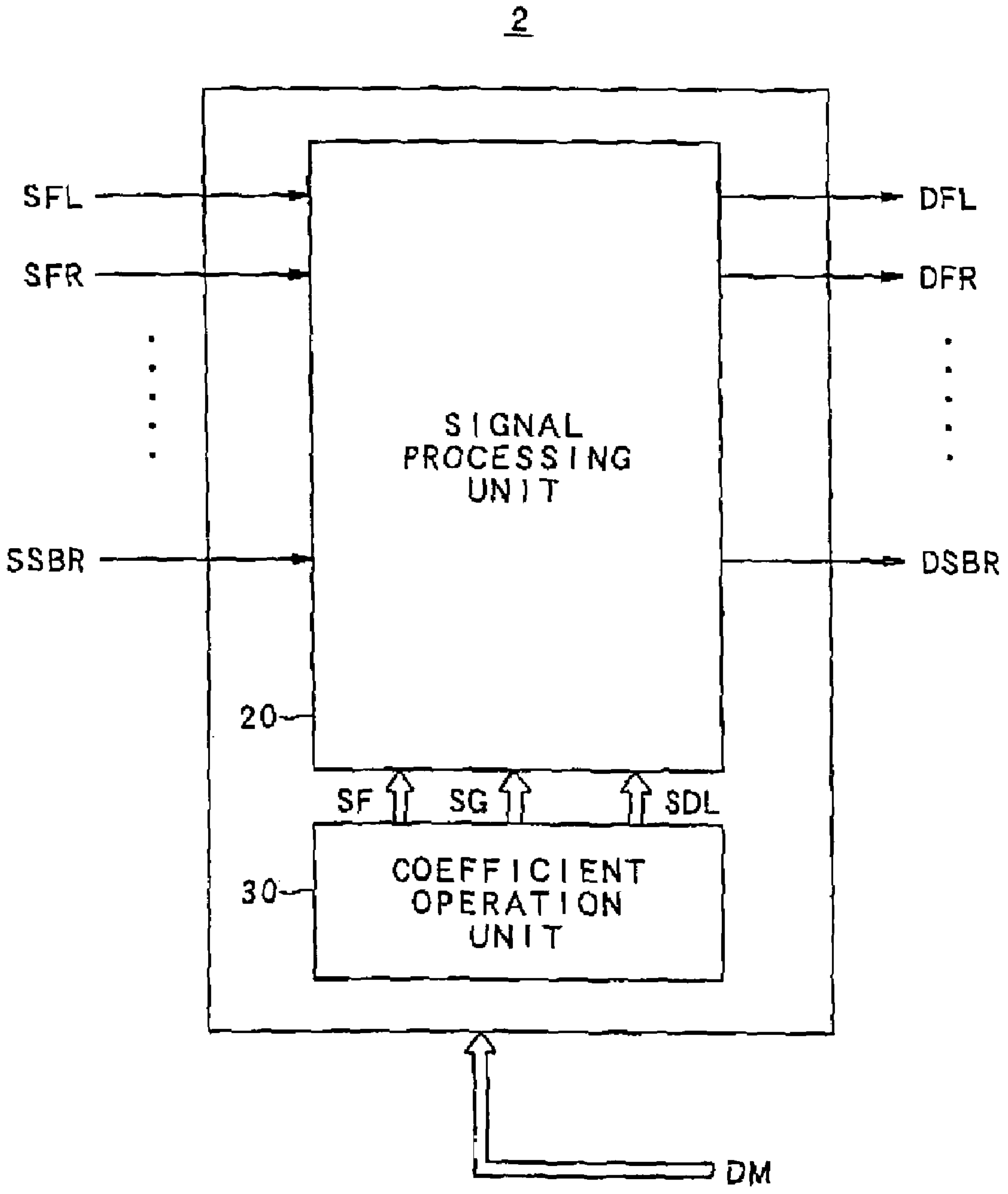
FIG. 12 is a block diagram showing an internal configuration of a signal processing circuit shown in FIG. 11.

The signal processing circuit 2 may have a digital signal processor (DSP), and roughly includes a signal processing unit 20 and a coefficient operating unit 30 as shown in FIG. 12. The signal processing unit 20 receives the multi-channel digital audio signals from the sound source 1 reproducing sound from various sound sources such as a CD, a DVD or else, and performs the frequency characteristics correction, the level correction and the delay characteristic correction for each channel to output the digital output signals DFL to DSBR. The coefficient operation unit 30 receives the signal collected by the microphone 8 as the digital collected sound data DM, generates the coefficient signals SF1 to SF8, SG1 to SG8, SDL1 to SDL8 for the frequency characteristics correction, the level correction and the delay characteristic correction, and supplies them to the signal processing unit 20. The signal processing unit 20 appropriately performs the frequency characteristics correction, the level correction and the delay characteristic correction based on the collected sound data DM from the microphone 8, and the speakers 6 output optimum sounds.

Figure 13:
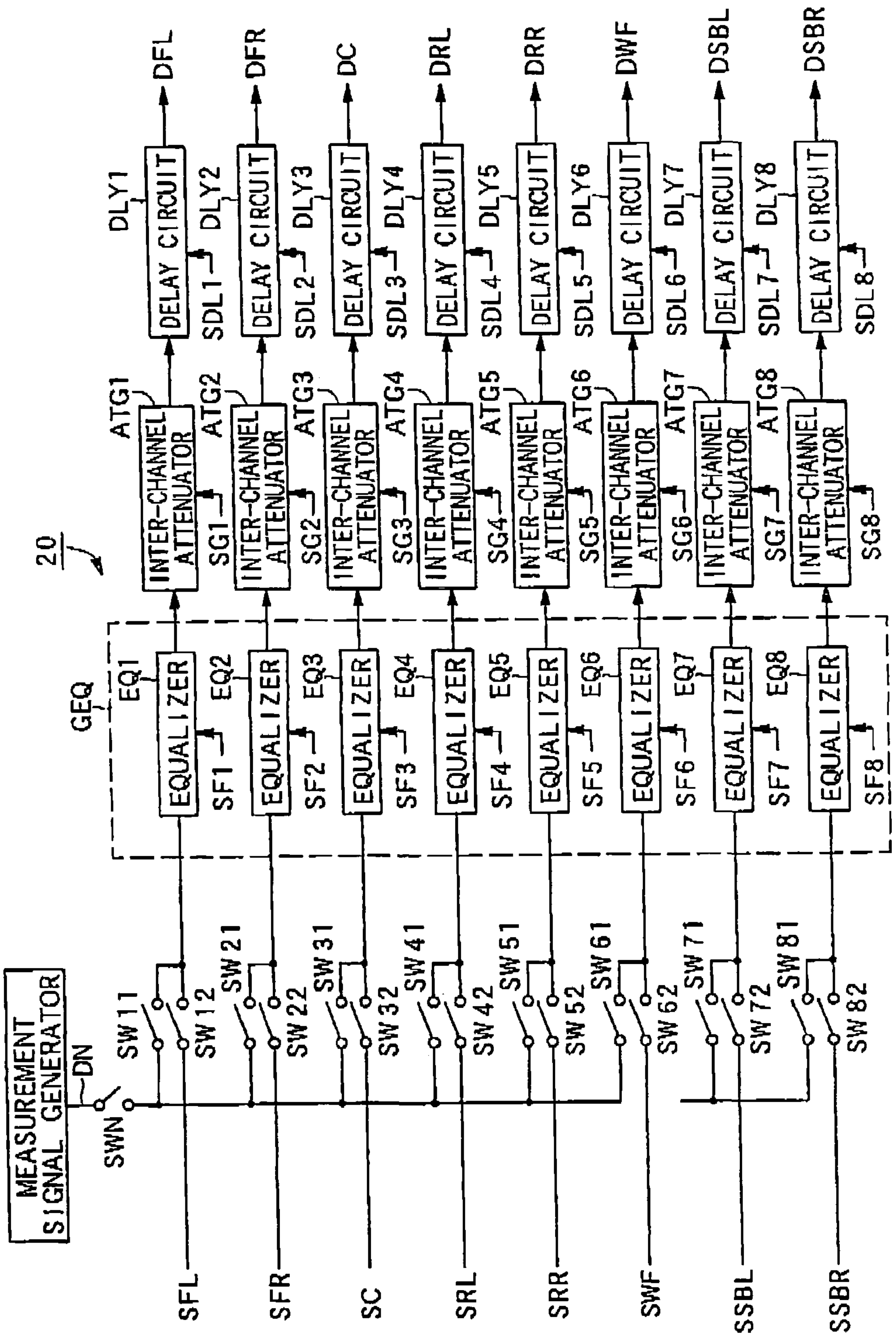
FIG. 13 is a block diagram showing a configuration of a signal processing unit shown in FIG. 12.
Figure 14:
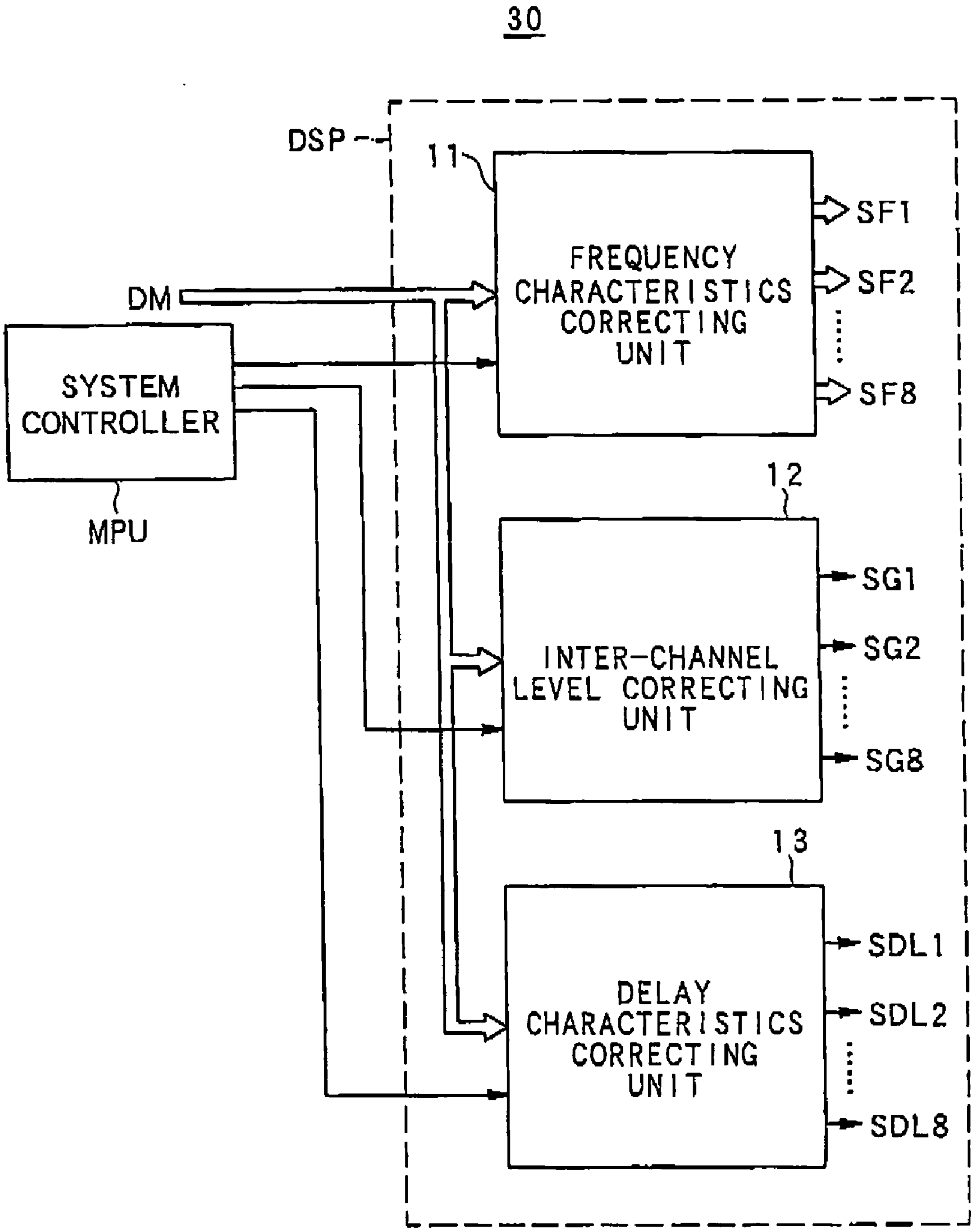
FIG. 14 is a block diagram showing a configuration of a coefficient operation unit shown in FIG. 12.

As shown in FIG. 13, the signal processing unit 20 includes a graphic equalizer GEQ, inter-channel attenuators ATG1 to ATG8, and delay circuits DLY1 to DLY8. On the other hand, the coefficient operation unit 30 includes, as shown in FIG. 14, a system controller MPU, a frequency characteristics correcting unit 11, an inter-channel level correcting unit 12 and a delay characteristics correcting unit 13. The frequency characteristics correcting unit 11, the inter-channel level correcting unit 12 and the delay characteristics correcting unit 13 constitute DSP.

The frequency characteristics correcting unit 11 controls the frequency characteristics of the equalizers EQ1 to EQ8 corresponding to the respective channels of the graphic equalizer GEQ. The inter-channel level correcting unit 12 controls the attenuation factors of the inter-channel attenuators ATG1 to ATG8, and the delay characteristics correcting unit 13 controls the delay times of the delay circuits DLY1 to DLY8. Thus, the sound field is appropriately corrected.

The equalizers EQ1 to EQ5, EQ7 and EQ8 of the respective channels are configured to perform the frequency characteristics correction for multiple frequency bands. Namely, the audio frequency band is divided into 9 frequency bands (each of the center frequencies are f1 to f9), for example, and the coefficient of the equalizer EQ is determined for each frequency band to correct frequency characteristics. It is noted that the equalizer EQ6 is configured to control the frequency characteristic of low-frequency band.

The audio system 100 has two operation modes, i.e., an automatic sound field correcting mode and a sound source signal reproducing mode. The automatic sound field correcting mode is an adjustment mode, performed prior to the signal reproduction from the sound source 1, wherein the automatic sound field correction is performed for the environment that the audio system 100 is placed. Thereafter, the sound signal from the sound source 1 such as a CD player is reproduced in the sound source signal reproduction mode. An explanation below mainly relates to the correction operation in the automatic sound field correcting mode.

With reference to FIG. 13, the switch element SW12 for switching ON and OFF the input digital audio signal SFL from the sound source 1 and the switch element SW11 for switching ON and OFF the input measurement signal DN from the measurement signal generator 3 are connected to the equalizer EQ1 of the FL-channel, and the switch element SW11 is connected to the measurement signal generator 3 via the switch element SWN.

The switch elements SW11, SW12 and SWN are controlled by the system controller MPU configured by microprocessor shown in FIG. 14. When the sound source signal is reproduced, the switch element SW12 is turned ON, and the switch elements SW11 and SWN are turned OFF. On the other hand, when the sound field is corrected, the switch element SW12 is turned OFF and the switch elements SW11 and SWN are turned ON.

The inter-channel attenuator ATG1 is connected to the output terminal of the equalizer EQ1, and the delay circuit DLY1 is connected to the output terminal of the inter-channel attenuator ATG1. The output DFL of the delay circuit DLY1 is supplied to the D/A converter 4FL shown in FIG. 11.

The other channels are configured in the same manner, and switch elements SW21 to SW81 corresponding to the switch element SW11 and the switch elements SW22 to SW82 corresponding to the switch element SW12 are provided. In addition, the equalizers EQ2 to EQ8, the inter-channel attenuators ATG2 to ATG8 and the delay circuits DLY2 to DLY8 are provided, and the outputs DFR to DSBR from the delay circuits DLY2 to DLY8 are supplied to the D/A converters 4FR to 4SBR, respectively, shown in FIG. 11.

Further, the inter-channel attenuators ATG1 to ATG8 vary the attenuation factors within the range equal to or smaller than 0 dB in accordance with the adjustment signals SG1 to SG8 supplied from the inter-channel level correcting unit 12. The delay circuits DLY1 to DLY8 control the delay times of the input signal in accordance with the adjustment signals SDL1 to SDL8 from the phase characteristics correcting unit 13.

Figure 15A:
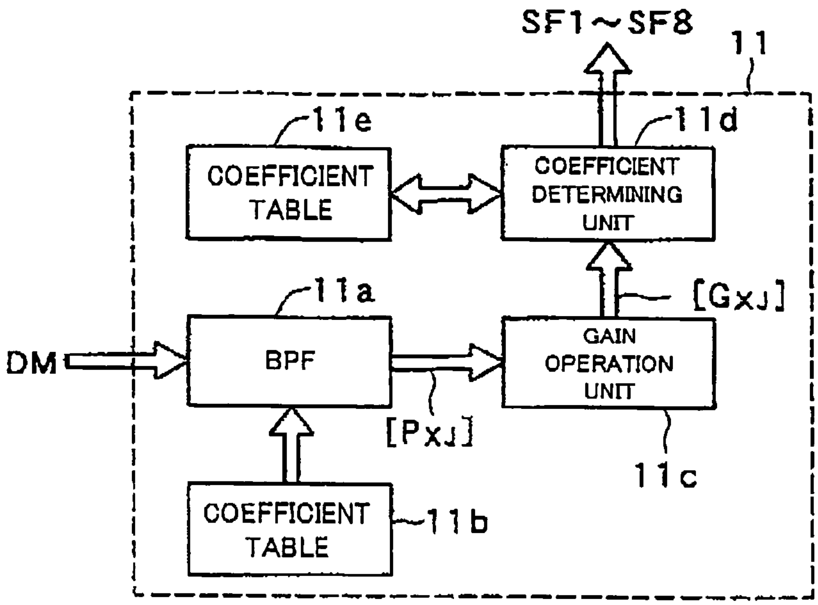
FIGS. 15A to 15C are block diagrams showing configurations of a frequency characteristics correcting unit, an inter-channel level correcting unit and a delay characteristics correcting unit shown in FIG. 14.

The frequency characteristics correcting unit 11 has a function to adjust the frequency characteristic of each channel to have a desired characteristic. As shown in FIG. 15A, the frequency characteristics correcting unit 11 includes a band-pass filter 11*a*, a coefficient table 11*b*, a gain operation unit 11*c*, a coefficient determining unit 11*d* and a coefficient table 11*e*.

The band-pass filter 11*a* is configured by a plurality of narrow-band digital filters passing 9 frequency bands set to the equalizers EQ1 to EQ8. The band-pass filter 11*a* discriminates 9 frequency bands each including center frequency f1 to f9 from the collected sound data DM from the A/D converter 10, and supplies the data [PxJ] indicating the level of each frequency band to the gain operation unit 11*c*. The frequency discriminating characteristic of the band-pass filter 11*a* is determined based on the filter coefficient data stored, in advance, in the coefficient table 11*b*.

The gain operation unit 11*c* operates the gains of the equalizers EQ1 to EQ8 for the respective frequency bands at the time of the automatic sound field correction based on the data [PxJ] indicating the level of each frequency band, and supplies the gain data [GxJ] thus operated to the coefficient determining unit 11*d*. Namely, the gain operation unit 11*c* applies the data [PxJ] to the transfer functions of the equalizers EQ1 to EQ8 known in advance to calculate the gains of the equalizers EQ1 to EQ8 for the respective frequency bands in the reverse manner.

The coefficient determining unit 11*d* generates the filter coefficient adjustment signals SF1 to SF8, used to adjust the frequency characteristics of the equalizers EQ1 to EQ8, under the control of the system controller MPU shown in FIG. 14. It is noted that the coefficient determining unit 11*d* is configured to generate the filter coefficient adjustment signals SF1 to SF8 in accordance with the conditions instructed by the listener, at the time of the sound field correction. In a case where the listener does not instruct the sound field correction condition and the normal sound field correction condition preset in the sound field correcting system is used, the coefficient determining unit 11*d* reads out the filter coefficient data, used to adjust the frequency characteristics of the equalizers EQ1 to EQ8, from the coefficient table 11*e* by using the gain data [GxJ] for the respective frequency bands supplied from the gain operation unit 11*c*, and adjusts the frequency characteristics of the equalizers EQ1 to EQ8 based on the filter coefficient adjustment signals SF1 to SF8 of the filter coefficient data.

In other words, the coefficient table 11*e* stores the filter coefficient data for adjusting the frequency characteristics of the equalizers EQ1 to EQ8, in advance, in a form of a look-up table. The coefficient determining unit 11*d* reads out the filter coefficient data corresponding to the gain data [GxJ], and supplies the filter coefficient data thus read out to the respective equalizers EQ1 to EQ8 as the filter coefficient adjustment signals SF1 to SF8. Thus, the frequency characteristics are controlled for the respective channels.

Figure 18:
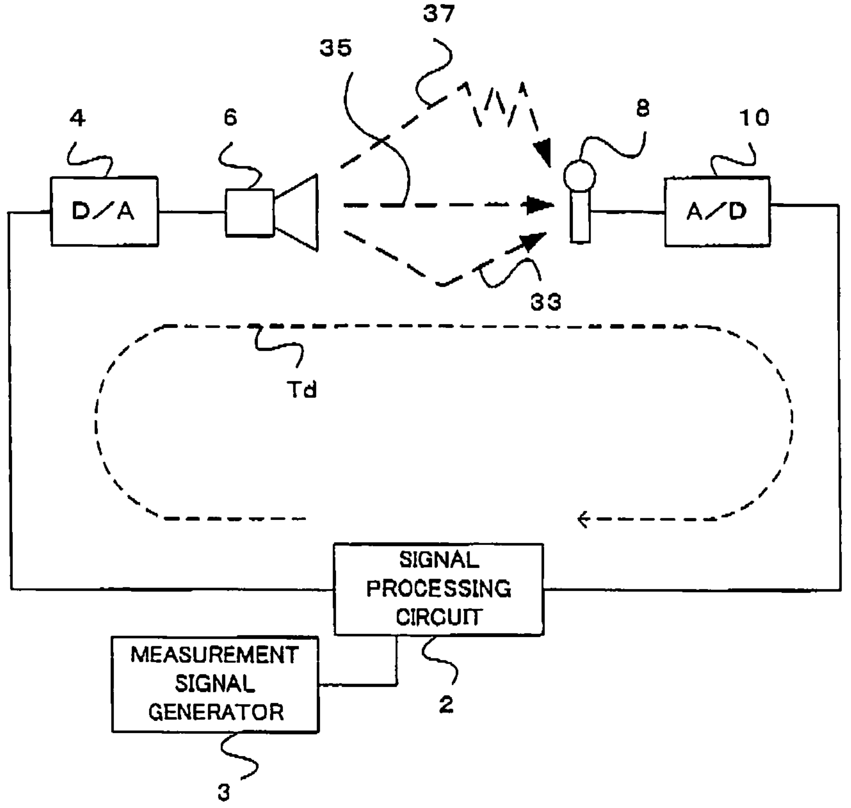
FIG. 18 schematically shows a configuration for performing frequency characteristics correction.

In the present embodiment, the sound characteristic which the frequency characteristics correcting unit 11 uses for adjusting the frequency characteristics is the sound characteristic obtained in the time period including no reverberation sound component. FIG. 18 schematically shows a method of adjusting the frequency characteristic by the frequency characteristics correcting unit 11. As shown in FIG. 18, in the frequency characteristics correction, the measurement signal outputted from the measurement signal generator 3, such as the pink noise, is outputted from the signal processing circuit 2, and is outputted from the speaker 6 as the measurement signal sound via the D/A converter 4. The measurement signal sound is collected by using the microphone 8, and is supplied to the signal processing circuit 2 as the collected sound data via the A/D converter 10.

The measurement signal sound outputted from the speaker 6 reaches the microphone 8 roughly as three kinds of sounds, i.e., the direct sound component 35, the initial reflective sound component 33 and the reverberation sound component 37. The direct sound component 35 is the sound component which is outputted from the speaker 6 and directly reaches the microphone 8 without undergoing any effect caused by an obstacle, such as a wall, a floor and the like. The initial reflective sound (also referred to as "first reflective sound") component 33 is a sound component which is reflected once by a wall and a floor in a room to reach the microphone 8. The reverberation sound component 37 is a sound component which is repeatedly reflected for a plurality of times by the wall and floor in the room and other obstacles to reach the microphone 8.

Figure 19:
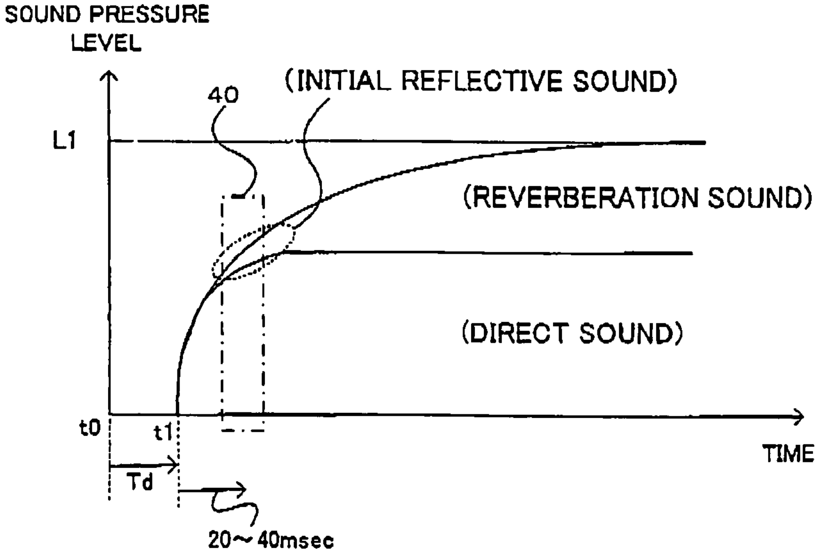
FIG. 19 is a graph showing variation of sound pressure of measurement signal sound of frequency characteristics correction.

FIG. 19 shows variation of the sound pressure level after the output of the measurement signal sound. It is noted that the pink noise is continuously outputted at a constant level as the measurement signal sound. When the measurement signal sound is outputted at time t0, the measurement signal sound is received by the signal processing circuit 2 at time t1 after the delay time Td passes. The delay time Td is time necessary for the measurement signal outputted from the signal processing circuit 2 to travel through a loop shown in FIG. 18 to return to the signal processing circuit 2. Concretely, the delay time Td corresponds to a total of three kinds of times: the time necessary for the measurement signal to be transmitted from the signal processing circuit 2 to the speaker 6 via the D/A converter 4, the time necessary for the measurement signal sound to be transmitted from the speaker 6 to the microphone 8, and the time necessary for the sound signal collected by the microphone 8 to be transmitted to the signal processing circuit 2 via the A/D converter 10. Namely, the delay time Td is the sum of the transmission time of the measurement signal sound and the electrical processing time of the measurement signal and the collected signal.

As shown in FIG. 19, it is the direct sound component of the measurement signal sound that the signal processing circuit 2 first receives, and the direct sound component is received at the constant level afterward. Thereafter, the signal processing circuit 2 begins to receive the initial reflective sound component immediately after time t1 at which the direct sound component is received, and further the reverberation sound component increases when several tens of milliseconds passes from time t1. The reverberation sound component is saturated at a constant level L1 afterward.

In the present embodiment, the time (referred to as "direct sound period") at which the direct sound component and the initial reflective sound component of the measurement signal sound has reached the signal processing circuit 2, but the reverberation sound component has hardly arrived yet, is prescribed as the measuring period subjected to the measurement, and the frequency characteristic of the signal transmission path for each channel is adjusted on the basis of the reverberation characteristic for each frequency band obtained in the direct sound period. Thereby, it is possible to exclude the effect of the reverberation sound component of the measurement signal sound in adjusting the frequency characteristic. The direct sound period 40 is a time period immediately after the measurement signal sound outputted from the speaker 6 reaches the signal processing circuit 2, and depends on the size and the structure of the room and space in which the present system is provided. In a case of a room in a normal house, the direct sound period is known to be within a range of approximately 20 msec to 40 msec from time t1 at which the measurement signal sound is first received. Therefore, for example, by setting the direct sound period to about 10 msec, which is within the range of 20 msec to 40 msec from time t1 at which the direct sound component of the measurement signal sound is first received, the measurement signal sound maybe detected during the time period, and analyzed to adjust the frequency characteristic.

Concretely, the configuration of the sound characteristic measuring device 200 explained above is applied to the audio system 100, and data having a predetermined length, e.g., the pink noise data of 80 ms which includes 4096 samples, is outputted as the measurement signal sound to measure the reverberation characteristic for each frequency. Then, the reverberation characteristic for each frequency band shown in FIG. 10 is generated. Subsequently, for each frequency band, the time period of about 10 ms within the range of 20 ms to 40 ms after the output of the measurement signal sound in the obtained reverberation characteristic is set as the direct sound period, and the frequency characteristics correction for each channel may be performed on the basis of the reverberation characteristic for each frequency band for the period.

Like this, if the reverberation characteristic for each frequency band in the direct sound period is measured as the measuring period subjected to the measurement and the frequency characteristic is adjusted on the basis of the measurement, the frequency characteristic of the signal transmission path of each channel can be adjusted to be the target characteristic, with respect to the direct sound, without an adverse effect of the reverberation sound. Although it is preferable that the direct sound period does not include the reverberation sound if possible, the direct sound period may include the initial reflective sound. When the sound source signal is reproduced after adjusting the frequency characteristic, the user usually listen not only the direct sound but also the initial reflective sound from the floor and the wall simultaneously, and therefore it is beneficial to adjust the frequency characteristic by considering the initial reflective sound. Therefore, the "direct sound period" may include not only the direct sound of the measurement signal sound but also the initial reflective sound.

In addition to the above-mentioned advantage that the target frequency characteristic can be set with respect to the direct sound for each channel, there is another advantage that the inter-channel characteristics can be unified without an adverse effect due to the circumstances in which the multi-channel reverberation characteristics are different.

Next, the description will be given of the inter-channel level correcting unit 12. The inter-channel level correcting unit 12 has a role to adjust the sound pressure levels of the sound signals of the respective channels to be equal. Specifically, the inter-channel level correcting unit 12 receives the collected sound data DM obtained when the respective speakers 6FL to 6SBR are individually activated by the measurement signal (pink noise) DN outputted from the measurement signal generator 3, and measures the levels of the reproduced sounds from the respective speakers at the listening position RV based on the collected sound data DM.

Figure 15B:
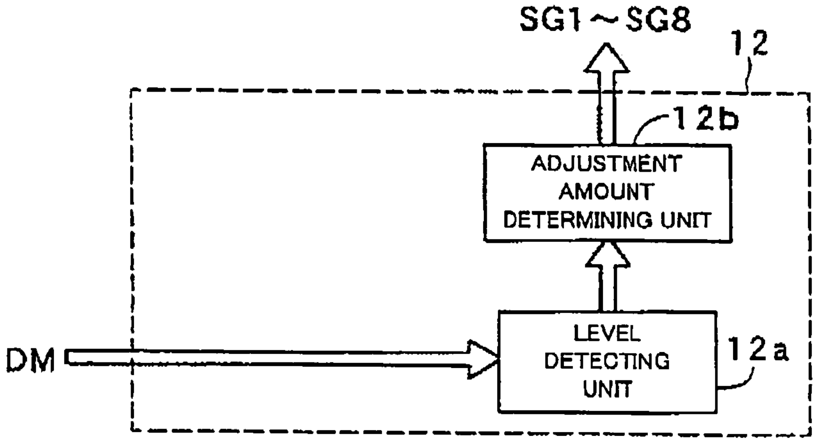

FIG. 15B schematically shows the configuration of the inter-channel level correcting unit 12. The collected sound data DM outputted by the A/D converter 10 is supplied to a level detecting unit 12*a*. It is noted that the inter-channel level correcting unit 12 uniformly attenuates the signal levels of the respective channels for all frequency bands, and hence the frequency band division is not necessary. Therefore, the inter-channel level correcting unit 12 does not include any band-pass filter as shown in the frequency characteristics correcting unit 11 in FIG. 15A.

The level detecting unit 12*a* detects the level of the collected sound data DM, and carries out gain control so that the output audio signal levels for all channels become equal to each other. Specifically, the level detecting unit 12*a* generates the level adjustment amount indicating the difference between the level of the collected sound data thus detected and a reference level, and supplies it to an adjustment amount determining unit 12*b*. The adjustment amount determining unit 12*b* generates the gain adjustment signals SG1 to SG8 corresponding to the level adjustment amount received from the level detecting unit 12*a*, and supplies the gain adjustment signals SG1 to SG8 to the respective inter-channel attenuators ATG1 to ATG8. The inter-channel attenuators ATG1 to ATG8 adjust the attenuation factors of the audio signals of the respective channels in accordance with the gain adjustment signals SG1 to SG8. By adjusting the attenuation factors of the inter-channel level correcting unit 12, the level adjustment (gain adjustment) for the respective channels is performed so that the output audio signal level of the respective channels become equal to each other.

The delay characteristics correcting unit 13 adjusts the signal delay resulting from the difference in distance between the positions of the respective speakers and the listening position RV. Namely, the delay characteristics correcting unit 13 has a role to prevent that the output signals from the speakers 6 to be listened simultaneously by the listener reach the listening position RV at different times. Therefore, the delay characteristics correcting unit 13 measures the delay characteristics of the respective channels based on the collected sound data DM which is obtained when the speakers 6 are individually activated by the measurement signal (pink noise) DN outputted from the measurement signal generator 3, and corrects the phase characteristics of the sound field space based on the measurement result.

Specifically, by turning over the switches SW11 to SW82 shown in FIG. 13 one after another, the measurement signal DN generated by the measurement signal generator 3 is output from the speakers 6 for each channel, and the output sound is collected by the microphone 8 to generate the correspondent collected sound data DM. Assuming that the measurement signal is a pulse signal such as an impulse, the difference between the time when the speaker 6 outputs the pulse measurement signal and the time when the microphone 8 receives the correspondent pulse signal is proportional to the distance between the speaker 6 of each channel and the listening position RV. Therefore, the difference in distance of the speakers 6 of the respective channels and the listening position RV may be absorbed by setting the delay time of all channels to the delay time of the channel having maximum delay time. Thus, the delay time between the signals generated by the speakers 6 of the respective channels become equal to each other, and the sound outputted from the multiple speakers 6 and coincident with each other on the time axis simultaneously reach the listening position RV.

Figure 15C:
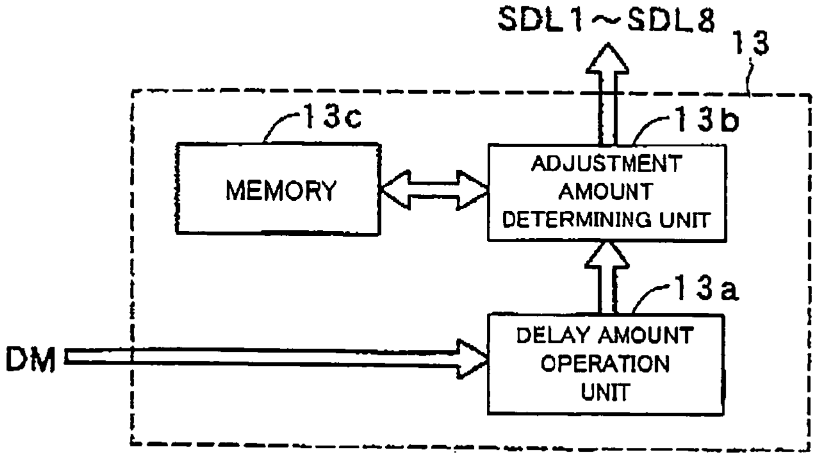

FIG. 15C shows the configuration of the delay characteristics correcting unit 13. A delay amount operation unit 13*a* receives the collected sound data DM, and operates the signal delay amount resulting from the sound field environment for the respective channels on the basis of the pulse delay amount between the pulse measurement signal and the collected sound data DM. A delay amount determining unit 13*b* receives the signal delay amounts for the respective channels from the delay amount operation unit 13*a*, and temporarily stores them in the memory 13*c*. When the signal delay amounts for all channels are operated and temporarily stored in the memory 13*c*, the delay amount determining unit 13*b* determines the adjustment amounts of the respective channels such that the reproduced signal of the channel having the largest signal delay amount reaches the listening position RV simultaneously with the reproduced sounds of other channels, and supplies the adjustment signals SDL1 to SDL8 to the delay circuits DLY1 to DLY8 of the respective channels. The delay circuits DLY1 to DLY8 adjust the delay amount in accordance with the adjustment signals SDL1 to SDL8, respectively. Thus, the delay characteristics for the respective channels are adjusted. It is noted that, while the above example assumed that the measurement signal for adjusting the delay time is the pulse signal, this invention is not limited to this, and other measurement signal may be used.

(Automatic Sound Field Correction Process)

Next, the description will be given of the operation of the automatic sound field correction by the automatic sound field correcting system employing the configuration described above.

First, as the environment in which the audio system 100 is used, the listener positions the multiple speakers 6FL to 6SBR in a listening room 7 as shown in FIG. 16, and connects the speakers 6FL to 6SBR to the audio system 100 as shown in FIG. 11. When the listener manipulates a remote controller (not shown) of the audio system 100 to instruct the start of the automatic sound field correction, the system controller MPU executes the automatic sound field correction process in response to the instruction.

Next, the basic principle of the automatic sound field correction according to the present invention will be described. As explained above, the process of the automatic sound field correction includes the frequency characteristics correction, the sound pressure level correction and the delay characteristics correction for the respective channels. In the present invention, in the frequency characteristics correction, the frequency characteristic for each channel is adjusted so that the predetermined frequency characteristic can be obtained mainly with respect to the direct sound (including the initial reflective sound). The frequency characteristic during the direct sound period can be obtained by performing the sound characteristic measurement for each frequency by the above-mentioned sound characteristic measuring device 200.

Figure 17:
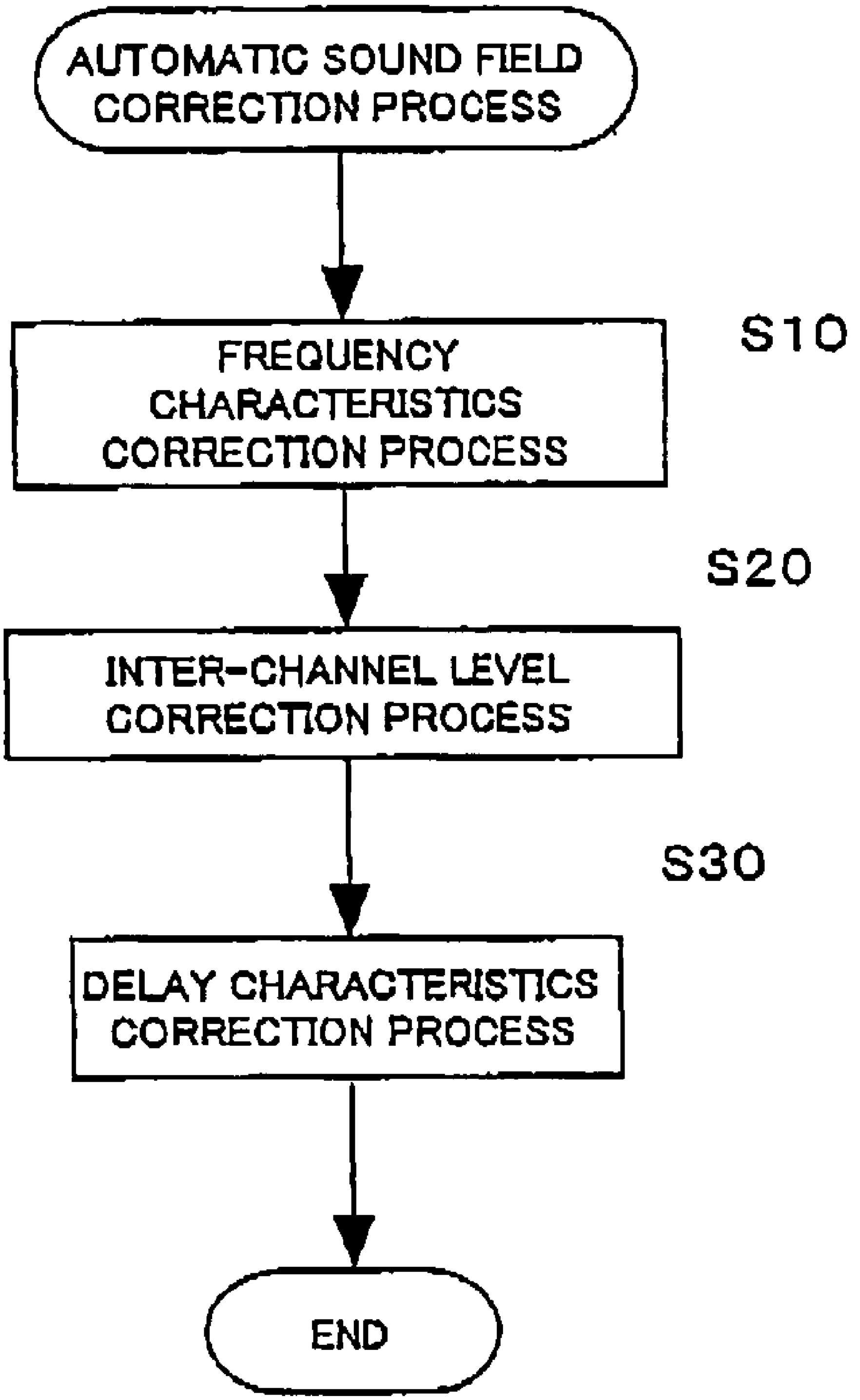
FIG. 17 is a flowchart showing a main routine of an automatic sound field correction process.

Next, the description will schematically be given of the automatic sound field correction process which includes such the frequency characteristics correction, with reference to a flow chart shown in FIG. 17.

First, in step S10, the frequency characteristics correcting unit 11 adjusts the frequency characteristics of the equalizers EQ1 to EQ8. Next, in an inter-channel level correction process in step S20, the inter-channel level correcting unit 12 adjusts the attenuation factors of the inter-channel attenuators ATG 1 to ATG 8 provided for the respective channels. Next, in a delay characteristics correction process in step S30, the delay characteristics correcting unit 13 adjusts the delay time of the delay circuits DLY1 to DLY8 of all the channels. The automatic sound field correction according to the present invention is performed in this order.

Figure 20:
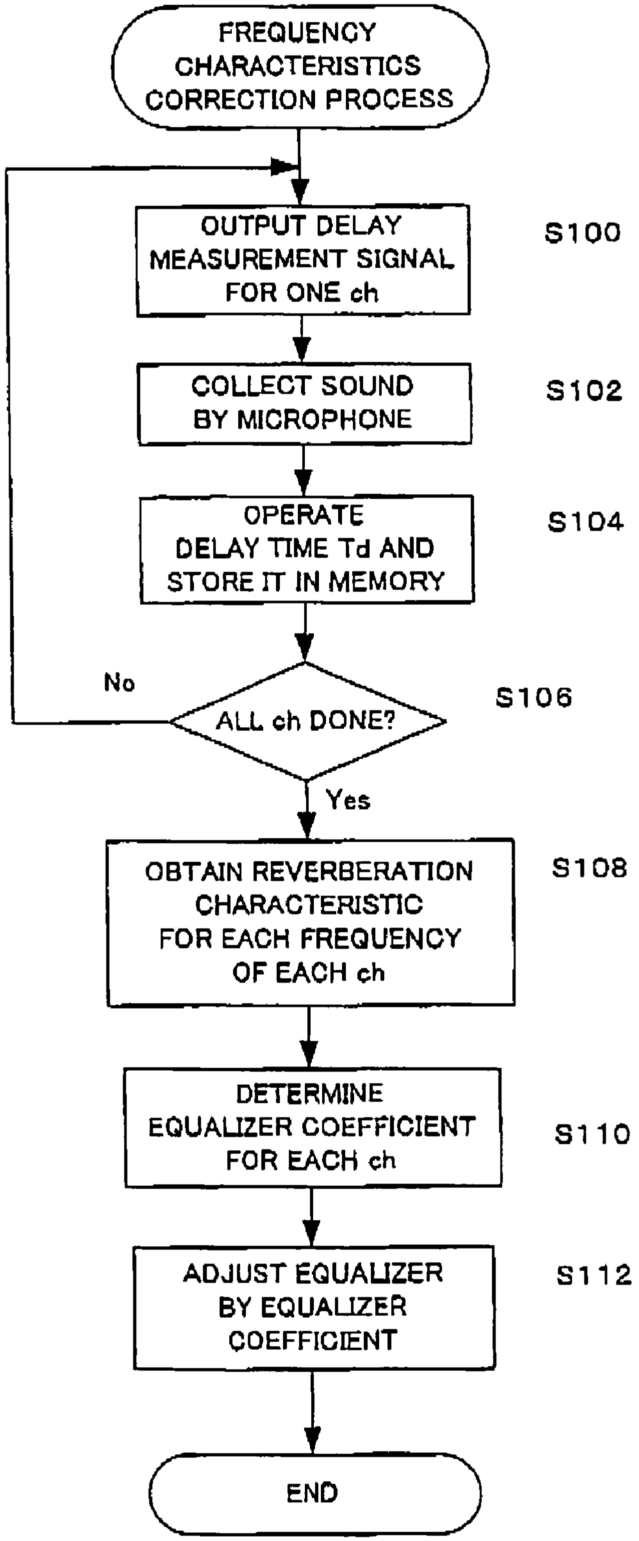
FIG. 20 is a flow chart showing a frequency characteristics correction process.

Next, the frequency characteristics correction process in step S10 will be explained in detail with reference to FIG. 20. FIG. 20 is a flow chart of the frequency characteristics correction process according to the present embodiment. It is noted that the frequency characteristics correction process shown in FIG. 20 is for performing the delay measurement for each channel prior to the frequency characteristics correction process for each channel. The delay measurement is the process of measuring a delay time from the output of the measurement signal by the signal processing circuit 2 until arrival of the correspondent collected sound data at the signal processing circuit 2, i.e., the process of pre-measuring the delay time Td shown in FIG. 18 for each channel. As shown in FIG. 19, since the direct sound period 40 is set within the range of a predetermined time period from time t1 at which the measurement signal sound reaches the signal processing circuit 2, the signal processing circuit 2 can correctly grasp time t1 by measuring the delay time Td for each channel, and can correctly detect the collected sound data DM in the direct sound period 40. In FIG. 20, a procedure in steps S100 to S106 corresponds to the delay measurement process, and a procedure in steps S108 to S116 corresponds to an actual frequency characteristics correction process.

In FIG. 20, the signal processing circuit 2 outputs the pulse delay measurement signal in one of the plural channels at first, and the signal is outputted from the speaker 6 as the measurement signal sound (step S100). The measurement signal sound is collected by the microphone 8, and the collected sound data DM is supplied to the signal processing circuit 2 (step S102). The frequency characteristics correcting unit 11 in the signal processing circuit 2 operates the delay time Td, and stores it in its memory and the like (step S104). When the process of all the steps S100 to S104 is executed with respect to all the channels (step S106; Yes), the delay times Td of all the channels are stored in the memory. Thus, the delay time measurement is completed.

Next, the frequency characteristics correction is performed for each channel. Concretely, the signal processing circuit 2 of the audio system 100 measures the reverberation characteristic for each frequency band by the configuration identical to the configuration of the above-mentioned sound characteristic measuring device 200 (step S108). By the measurement, the reverberation characteristic corresponding to only the direct sound period can be obtained.

Then, the coefficient determining unit 11*d* in the frequency characteristics correcting unit 11 sets the equalizer coefficient for each channel on the basis of the obtained reverberation characteristic (step S110), and the equalizers are adjusted on the basis of the equalizer coefficients (step S112). In such the method, the frequency characteristics correction process for each channel is completed on the basis of the reverberation characteristic in the direct sound period.

Afterward, the inter-channel level correction process is executed in step S20, and further the delay characteristics correction process is executed in step S30. Thus, the automatic sound field correction process is completed.

In the above-mentioned embodiment, the signal process according to the present invention is realized by the signal processing circuit. Instead, if the identical signal process is designed as a program to be executed on a computer, the signal process can be realized on the computer. In that case, the program is supplied by a recording medium, such as a CD-ROM and a DVD, or by communication by using a network and the like. As the computer, a personal computer and the like can be used, and an audio interface corresponding to plural channels, plural speakers and microphones and the like are connected to the computer as peripheral devices. By executing the above-mentioned program on the personal computer, the measurement signal is generated by using the sound source provided inside or outside the personal computer, and is outputted via the audio interface and the speaker to be collected by using the microphone. Thereby, the above-mentioned sound characteristic measuring device and automatic sound field correcting device can be realized by using the computer.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-389022 filed on Nov. 19, 2003 including the specification, claims, drawings and summary is incorporated herein by reference in its entirety.

What is claimed is:

1. A sound characteristic measuring device comprising:

a measurement sound output unit which outputs measurement sound to a sound space;

a detecting unit which collects the measurement sound in the sound space and outputs correspondent detected sound data; and a characteristic determining unit which determines a sound characteristic in the sound space based on the detected sound data, wherein the measurement sound output unit includes:

a block sound data generating unit which divides measurement sound data of a predetermined time period into plural block periods and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, and wherein the characteristic determining unit operates the detected sound data corresponding to the block sound data reproduced at an identical reproduction order during each reproduction process, and determines the sound characteristic.

2. The sound characteristic measuring device according to claim 1, wherein the characteristic determining unit determines a reverberation characteristic for each block period based on the detected sound data corresponding to the block sound data reproduced at the identical reproduction order.

3. The sound characteristic measuring device according to claim 2, wherein the characteristic determining unit generates the reverberation characteristic during the predetermined time period based on the reverberation characteristic for each block period.

4. The sound characteristic measuring device according to claim 2, wherein the characteristic determining unit comprises:

a unit which divides the detected data into a predetermined number of frequency bands and generates detected data for each frequency band; and a unit which determines the reverberation characteristic for each of the predetermined number of frequency bands based on the detected data for each frequency band.

5. The sound characteristic measuring device according to claim 1, wherein the reproduction processing unit executes the reproduction process for a number of block periods included in the measurement sound data.

6. The sound characteristic measuring device according to claim 1, wherein the reproduction processing unit reproduces the plural block sound data repeatedly for plural cycles during one reproduction process.

7. A sound characteristic measuring device comprising:

a measurement sound output unit which outputs measurement sound including a signal of a predetermined frequency to a sound space;

a detecting unit which collects the measurement sound in the sound space and outputs correspondent detected sound data; and a characteristic determining unit which determines a sound characteristic in the sound space based on the detected sound data, wherein the measurement sound output unit includes:

a block sound data generating unit which divides measurement sound data of a predetermined time period into plural block periods each being smaller than a period corresponding to the predetermined frequency and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, and wherein the characteristic determining unit operates the detected sound data corresponding to the block sound data reproduced at an identical reproduction order during each reproduction process, and determines the sound characteristic of time width smaller than the period corresponding to the predetermined frequency.

8. An automatic sound field correcting device for applying a signal process onto plural audio signals on corresponding signal transmission paths respectively and outputting processed audio signals to correspondent plural speakers, comprising:

a measurement sound output unit which outputs measurement sound to each signal transmission path;

a detecting unit which collects the measurement sound on each signal transmission path, and outputs correspondent detected sound data;

a characteristic determining unit which determines a sound characteristic of each signal transmission path in a measuring period subjected to measurement based on the detected sound data; and a frequency characteristic adjusting unit which adjusts a frequency characteristic of an audio signal of each signal transmission path based on the sound characteristic, wherein the measurement sound output unit includes:

a block sound data generating unit which divides measurement sound data of a predetermined time period into plural block periods, and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, and wherein the characteristic determining unit operates the detected sound data corresponding to the block sound data reproduced at an identical reproduction order during each reproduction process, and determines the sound characteristic of each signal transmission path in the measuring period subjected to the measurement.

9. A computer program product in a computer-readable medium executed on a computer, the computer program product making the computer function as a sound characteristic measurement device comprising:

a measurement sound output unit which outputs measurement sound to a sound space;

a detecting unit which collects the measurement sound in the sound space and outputs correspondent detected sound data; and a characteristic determining unit which determines a sound characteristic in the sound space based on the detected sound data, and the measurement sound output unit including:

a block sound data generating unit which divides measurement sound data of a predetermined time period into plural block periods, and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, wherein the characteristic determining unit operates the detected sound data corresponding to the block sound data reproduced at an identical reproduction order during each reproduction process, and determines the sound characteristic.

10. A computer program product in a computer-readable medium executed on a computer, the computer program product making the computer function as a sound characteristic measuring device comprising:

a measurement sound output unit which outputs measurement sound including a signal of a predetermined frequency to a sound space;

a detecting unit which collects the measurement sound in the sound space and outputs correspondent detected sound data; and a characteristic determining unit which determines a sound characteristic in the sound space based on the detected sound data, and the measurement sound output unit including:

a block sound data generating unit which divides measurement sound data of a predetermined time period into plural block periods each being smaller than a period corresponding to the predetermined frequency, and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, wherein the characteristic determining unit operates the detected sound data corresponding to the block sound data reproduced at an identical reproduction order during each reproduction process, and determines the sound characteristic of time width smaller than the period corresponding to the predetermined frequency.

11. A computer program product in a computer-readable medium executed on a computer, the computer program product making the computer function as an automatic sound field correcting device which applies a signal process on a correspondent signal transmission path respectively for plural audio signals, and outputs the processed audio signal to plural correspondent speakers, the automatic sound field correcting device comprising:

a measurement sound output unit which outputs measurement sound to each signal transmission path;

a detecting unit which collects the measurement sound on each signal transmission path and outputs correspondent detected sound data;

a characteristic determining unit which determines a sound characteristic of each signal transmission path of a measuring period subjected to measurement based on the detected sound data; and a frequency characteristic adjusting unit which adjusts a frequency characteristic of the audio signal of each signal transmission path based on the sound characteristic, wherein the measurement sound output unit includes:

a block sound data generating unit which divides measurement sound data of a predetermined time period into plural block periods and generates plural block sound data; and a reproduction processing unit which executes a reproduction process of reproducing the plural block sound data in a reproduction order pattern forming the measurement sound data, for all patterns of the reproduction order obtained by shifting block sound data reproduced first by one, to output the measurement sound, and wherein the characteristic determining unit operates the detected sound data corresponding to the block sound data reproduced at an identical reproduction order during each reproduction process, and determines the sound characteristic of each signal transmission path in the measuring period subjected to the measurement.

12. A sound characteristic measurement method comprising:

a measurement sound output process which outputs measurement sound to a sound space;

a detecting process which collects the measurement sound in the sound space and outputs correspondent detected sound data; and a characteristic determining process which determines a sound characteristic in the sound space based on the detected sound data, wherein the measurement sound output process divides measurement sound data of a predetermined time period into plural block periods, and generates plural block sound data, wherein a reproduction process of reproducing the plural block sound data in a reproduction order pattern forming the measurement sound data is executed for all patterns of the reproduction order obtained by shifting block sound data reproduced first by one, and the measurement sound is outputted, and wherein the characteristic determining process operates the detected sound data corresponding to the block sound data reproduced at an identical reproduction order during each reproduction process, and determines the sound characteristic.

13. A sound characteristic measurement method comprising:

a measurement sound output process which outputs measurement sound including a signal of a predetermined frequency to a sound space;

a detecting process which collects the measurement sound in the sound space and outputs correspondent detected sound data; and a characteristic determining process which determines a sound characteristic in the sound space based on the detected sound data, wherein the measurement sound output process divides measurement sound data of a predetermined time period into plural block periods each being smaller than a period corresponding to the predetermined frequency respectively, and generates plural block sound data, wherein a reproduction process of reproducing the plural block sound data in a reproduction order pattern forming the measurement sound data is executed for all patterns of the reproduction order obtained by shifting block sound data reproduced first by one, and the measurement sound is outputted; and wherein the characteristic determining process operates the detected sound data corresponding to the block sound data reproduced at an identical reproduction order during each reproduction process, and determines the sound characteristic of time width smaller than the period corresponding to the predetermined frequency.

14. An automatic sound field correcting method for applying signal processing onto plural audio signals on corresponding signal transmission paths and outputting processed audio signals to plural speakers, comprising:

a measurement sound output process which outputs measurement sound to each signal transmission path;

a detecting process which collects the measurement sound on each signal transmission path, and outputs correspondent detected sound data;

a characteristic determining process which determines a sound characteristic of each signal transmission path in a measuring period subjected to measurement based on the detected sound data; and a frequency characteristic adjustment process which adjusts a frequency characteristic of the audio signal of each signal transmission path based on the sound characteristic, wherein the measurement sound output process generates block sound data which divides measurement sound data of a predetermined time period into plural block periods, and generates plural block sound data, wherein a reproduction process of reproducing the plural block sound data in a reproduction order pattern forming the measurement sound data is executed for all patterns of the reproduction order obtained by shifting block sound data reproduced first by one, and the measurement sound is outputted, thereby the measurement sound is outputted, and wherein the characteristic determining process operates the detected sound data corresponding to the block sound data reproduced at an identical reproduction order during each reproduction process, and determines sound characteristic of each signal transmission path in the measuring period subjected to the measurement.

* * * * *